United States Patent [19]
Hamano et al.

[11] Patent Number: 5,251,043
[45] Date of Patent: Oct. 5, 1993

[54] FACSIMILE APPARATUS COMPRISING MEANS FOR CONTINUOUSLY TRANSMITTING PLURAL GROUPS OF IMAGE DATA TO THE SAME RECEIVER PARTY

[75] Inventors: Hiroaki Hamano, Osaka; Akio Nakajima, Toyokawa, both of Japan

[73] Assignee: Minolta Camera Kabushiki Kaisha, Osaka, Japan

[21] Appl. No.: 776,636

[22] Filed: Oct. 15, 1991

[30] Foreign Application Priority Data

| Oct. 15, 1990 | [JP] | Japan | 2-277402 |
| Oct. 15, 1990 | [JP] | Japan | 2-277403 |
| Oct. 15, 1990 | [JP] | Japan | 2-277404 |

[51] Int. Cl.⁵ .......................................... H04N 1/32
[52] U.S. Cl. ............................. 358/402; 358/407; 358/440; 358/444
[58] Field of Search ............... 358/402, 440, 407, 434, 358/442, 468, 437, 438, 404, 405, 403, 444; 379/100

[56] References Cited

U.S. PATENT DOCUMENTS

| 4,353,097 | 10/1982 | Takeda et al. | 379/100 |
| 5,077,787 | 12/1991 | Masatomo | 358/440 |

Primary Examiner—Edward L. Coles, Sr.
Assistant Examiner—Scott A. Rogers
Attorney, Agent, or Firm—Willian Brinks Olds Hofer Gilson & Lione

[57] ABSTRACT

In a facsimile apparatus including a continuous transmission function, an image reader reads images of first and second documents to be transmitted set thereon and converts the read images into first and second image data, respectively, and a reservation controller controls a transmitter to start transmitting the second image data at a predetermined timing. Further, there is provided a judgment controller for judging whether or not the first and second receiver parties agree with each other when the first image data are transmitted by the transmitter after a communication line controller connects the transmitter through a communication line with a facsimile apparatus of the first receiver party, and a transmission controller for controlling the transmitter and the communication line controller to start transmitting the second image data without disconnecting the transmitter from the facsimile apparatus of the first receiver party after completion of transmitting the first image data, when the agreement of the receiver parties is judged by the judgment controller.

13 Claims, 31 Drawing Sheets

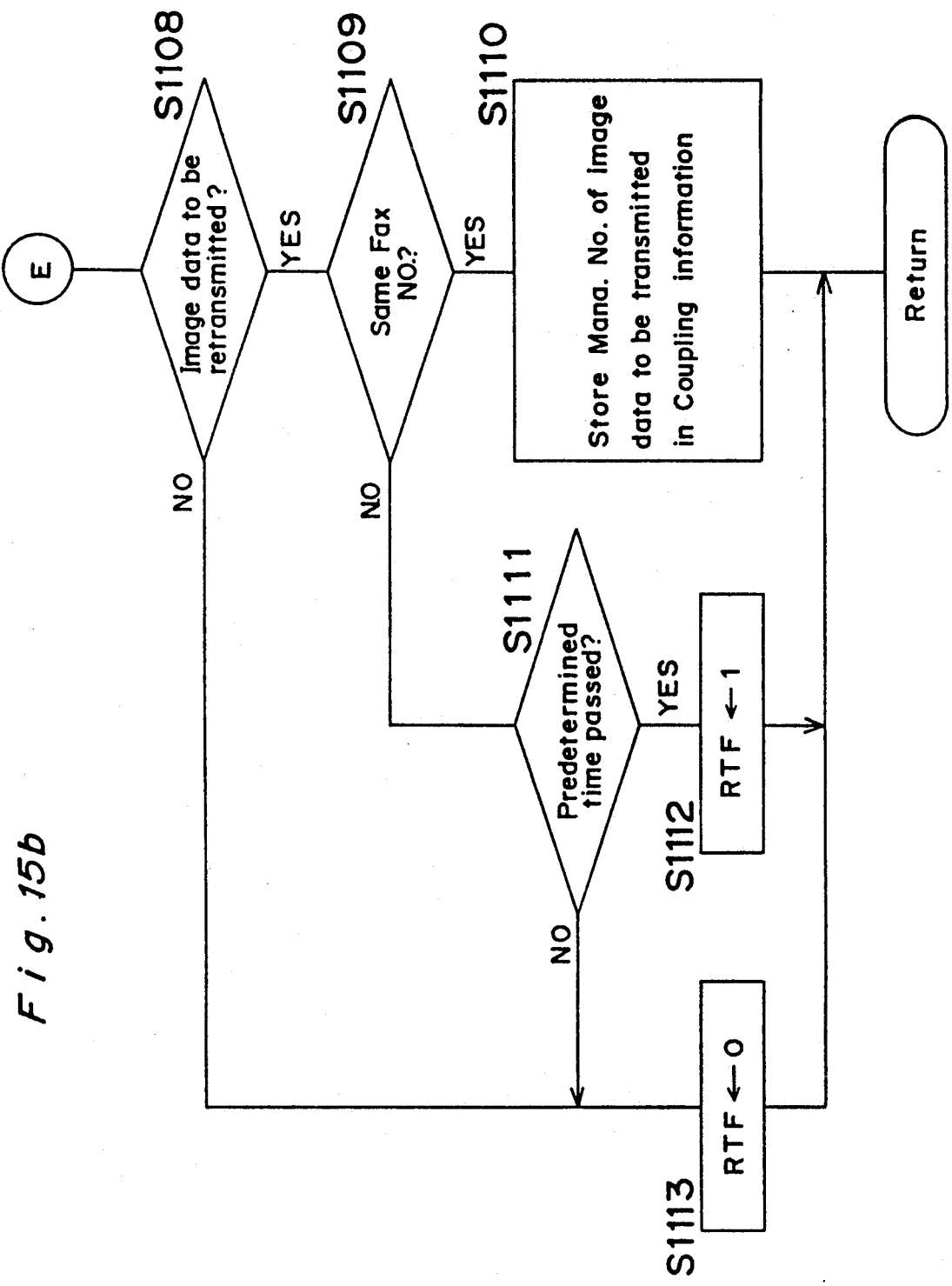

FACSIMILE APPARATUS COMPRISING MEANS FOR CONTINUOUSLY TRANSMITTING PLURAL GROUPS OF IMAGE DATA TO THE SAME RECEIVER PARTY

BACKGROUND OF THE INVENTION

1. Field of the Invention

The present invention relates to a facsimile apparatus, and more particularly, to a facsimile apparatus comprising means for continuously transmitting plural groups of image data to another facsimile apparatus of the same receiver or destination party without disconnecting a transmitter thereof from another facsimile apparatus of the same receiver party through a communication line when it is judged that the plural groups of image data are to be transmitted thereto.

2. Description of the Prior Art

Conventional facsimile apparatuses are equipped with a timer reservation function for transmitting image data to a facsimile apparatus of the other party or destination party selected beforehand at an appointed time.

A facsimile apparatus of this type is driven in a manner as will be described hereinbelow.

When a document is placed onto a document tray of an automatic document feeder unit (referred to as an ADF unit hereinafter), a transmission reservation key is depressed, and then, a telephone number of the facsimile apparatus (referred to as a facsimile number hereinafter) of the other party and an appointed time are input. Then, the following depression of a timer reservation key allows the ADF unit to send a plurality of documents to an image reading part one by one, whereby image data of a document image read by the image reading part are stored in an image memory. At the appointed time afterwards, the facsimile apparatus of the outgoing party is connected with the facsimile apparatus of the other or receiver party through a telephone line. As a result, the image data stored in the image memory are read and converted to predetermined facsimile signals, which are transmitted to the facsimile apparatus of the other party through the telephone line. Thereafter, the line with the facsimile apparatus of the other party is disconnected when the image data of all the documents are completely transmitted thereto.

In a conventional facsimile apparatus connected to only one telephone line, when first image data are to be transmitted while second image data are being transmitted, since it is impossible to send the first image data promptly, the first image data are temporarily stored in an image memory for a transmission reservation, automatically. Thereafter, when the second image data are finished to be transmitted, the first image data are transmitted to a destination.

Further, according to the conventional practice, if a subscriber telephone line of a facsimile apparatus of the other party is occupied and busy, image data to be transmitted are temporarily stored in an image memory for a retransmission. In the event the line connection with the other party is impossible even a predetermined time later, re-trials for the line connection therewith are arranged a preset number of times.

However, in the conventional facsimile apparatus of this type, even when a destination party to which further image data are to be transmitted by the above-mentioned timer reservation, the above-mentioned transmission reservation or the above-mentioned retransmission is the same as a destination party to which image data are being currently transmitted, it is necessary to connect with the same destination party through a communication line again after disconnecting the communication line with the same destination party, and to transmit the above further image data thereto. Therefore, it is a waste of time to disconnect the communication line with the same destination party once and to connect with the same again, resulting in lowering the transmission efficiency of the image data.

Moreover, since the communication line with the above same destination party is disconnected once, an incoming call from another facsimile may be received while the line is being disconnected, and then, it becomes impossible to connect to the facsimile apparatus of the above same destination party through the communication line.

SUMMARY OF THE INVENTION

The object of the present invention is therefore to provide a facsimile apparatus capable of continuously transmitting plural groups of image data to another facsimile apparatus of the same receiver or destination party without disconnecting a transmitter thereof from another facsimile apparatus of the same receiver party through a communication line when it is judged that the plural groups of image data are to be transmitted thereto.

Another object of the present invention is to provide a facsimile apparatus capable of continuously transmitting first and second image data to another facsimile apparatus of the same receiver or destination party without disconnecting a transmitter thereof from another facsimile apparatus of the same receiver party through a communication line when a receiver party to which the first image data are transmitted is the same as that to which the second image data reserved by the above-mentioned transmission reservation, the above-mentioned timer reservation, or the above-mentioned retransmission are to be transmitted.

In order to achieve the aforementioned objective, according to one aspect of the present invention, there is provided a facsimile apparatus comprising:

reading means for reading images of first and second documents to be transmitted set thereon and converting said read images into first and second image data, respectively;

party setting means for setting a first receiver party to which said first image data are to be transmitted and a second receiver party to which said second image data are to be transmitted;

transmitting means for transmitting image data to a facsimile apparatus of a receiver party;

communication line control means for connecting said transmitting means through a communication line with a facsimile apparatus of a receiver party set by said party setting means before start of transmitting image data by said transmitting means, and disconnecting said connected facsimile apparatus from said transmitting means after completion of transmitting said image data by said transmitting means;

reservation control means for controlling said transmitting means to start transmitting said second image data at a predetermined timing;

judgment means for judging whether or not said first receiver party set by said party setting means agrees with said second receiver party set by said party setting means when said first image data are transmitted by said transmitting means after said communication line control means connects said transmitting means through said communication line with a facsimile apparatus of said first receiver party; and transmission control means for controlling said transmitting means and said communication line control means to start transmitting said second image data without disconnecting said transmitting means from said facsimile apparatus of said first receiver party after completion of transmitting said first image data, when it is judged by said judgment means that said first receiver party agrees with said second receiver party.

According to another aspect of the present invention, there is provided a facsimile apparatus comprising:

reading means for reading an images of a document to be transmitted set thereon and converting said read image into image data;

party setting means for setting a receiver party to which said image data are to be transmitted;

transmitting means for transmitting image data to a facsimile apparatus of a receiver party;

communication line control means for connecting said transmitting means through a communication line with a facsimile apparatus of a receiver party set by said party setting means before start of transmitting image data by said transmitting means, and disconnecting said connected facsimile apparatus from said transmitting means after completion of transmitting said image data by said transmitting means;

storage means for temporarily storing image data;

reservation control means for controlling said storage means to temporarily store said image data and controlling said transmitting means to start transmitting said image data a predetermined time later from a timing when said transmitting means is not connected through said communication line with said facsimile apparatus of said receiver party set by said party setting means;

judgment means for judging whether or not said receiver party to which said image data stored in said storage means are to be transmitted agrees with the next receiver party next set by said party setting means after next setting an image of a further document corresponding to further image data on said reading means; and transmission control means for controlling said transmitting means and said communication line control means to continuously transmitting said image data temporarily stored in said storage means and said further image data without disconnecting said transmitting means from said facsimile apparatus of said receiver party, when it is judged by said judgment means that said receiver parties agree with each other.

According to a further aspect of the present invention, there is provided a facsimile apparatus comprising:

reading means for reading an images of a document set thereon to be transmitted and converting said read image into image data;

party setting means for setting a receiver party to which said image data are to be transmitted;

time setting means for setting an appointing time when said image data converted by said reading means are to be transmitted;

image data storage means for storing said image data converted by said reading means;

transmission data storage means for storing an appointing time set by said time setting means and a receiver party set by said party setting means;

transmitting means for transmitting image data to a facsimile apparatus of a receiver party;

communication line control means for connecting said transmitting means through a communication line with a facsimile apparatus of a receiver party set by said party setting means before start of transmitting image data by said transmitting means, and disconnecting said connected facsimile apparatus from said transmitting means after completion of transmitting said image data by said transmitting means;

judgment means for judging whether or not said receiver party stored in said transmission data storage means agrees with the next receiver party next set by said party setting means after next setting an image of a further document corresponding to further image data on said reading means in the case where said image data to be transmitted are stored in said image data storage means;

selection means for selecting whether or not said image data stored in said image data storage means are to be continuously transmitted together with said further image data corresponding to said further document set on said reading means, when the agreement of said receiver parties is judged by said judgment means; and transmission control means for controlling said transmitting means and said communication line control means to continuously transmitting said image data stored in said image data storage means together with said further image data without disconnecting said transmitting means from said facsimile apparatus of said receiver party, when said appointing time set by said time setting means has come in the case where it is selected by said selection means that said image data stored in said image data storage means are to be continuously transmitted together with said further image data corresponding to said further document next set on said reading means.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 15a and 15b are flow charts of a transmission request checking process shown in FIG. 13;

DETAILED DESCRIPTION OF THE PREFERRED EMBODIMENTS

The preferred embodiments according to the present invention will be described below with reference to the attached drawings.

First Preferred Embodiment

A facsimile apparatus according to a first preferred embodiment of the present invention will be depicted in an order of the following items with reference to the accompanying drawings.
(a) Structure of facsimile apparatus
(b) Operation panel
(c) Main controlling part
(d) Processes by facsimile apparatus
 (d-1) Main routine
 (d-2) Inputting and outputting process
 (d-3) Standby mode process
 (d-4) Transmitting mode process According to the facsimile apparatus of the first preferred embodiment, while the facsimile apparatus transmits first image data corresponding to images of the first documents stored in a random access memory (referred to as a RAM hereinafter) 34 reading out them from the RAM 34 after reading the images and storing them in the RAM 34, if it is judged that a facsimile number of a destination party to which new image data of the second documents is to be transmitted and which is set by the transmission reservation until transmission of the first image data is completed is the same as the facsimile number of the facsimile apparatus to which the first image data is transmitted, the facsimile apparatus of the first preferred embodiment is characterized in transmitting the image data of the second documents to the same destination party as that to which the first image data are transmitted, reading the images of the second documents, in succession to the transmission of the first image data.

(a) Structure of facsimile apparatus

Figure 1:
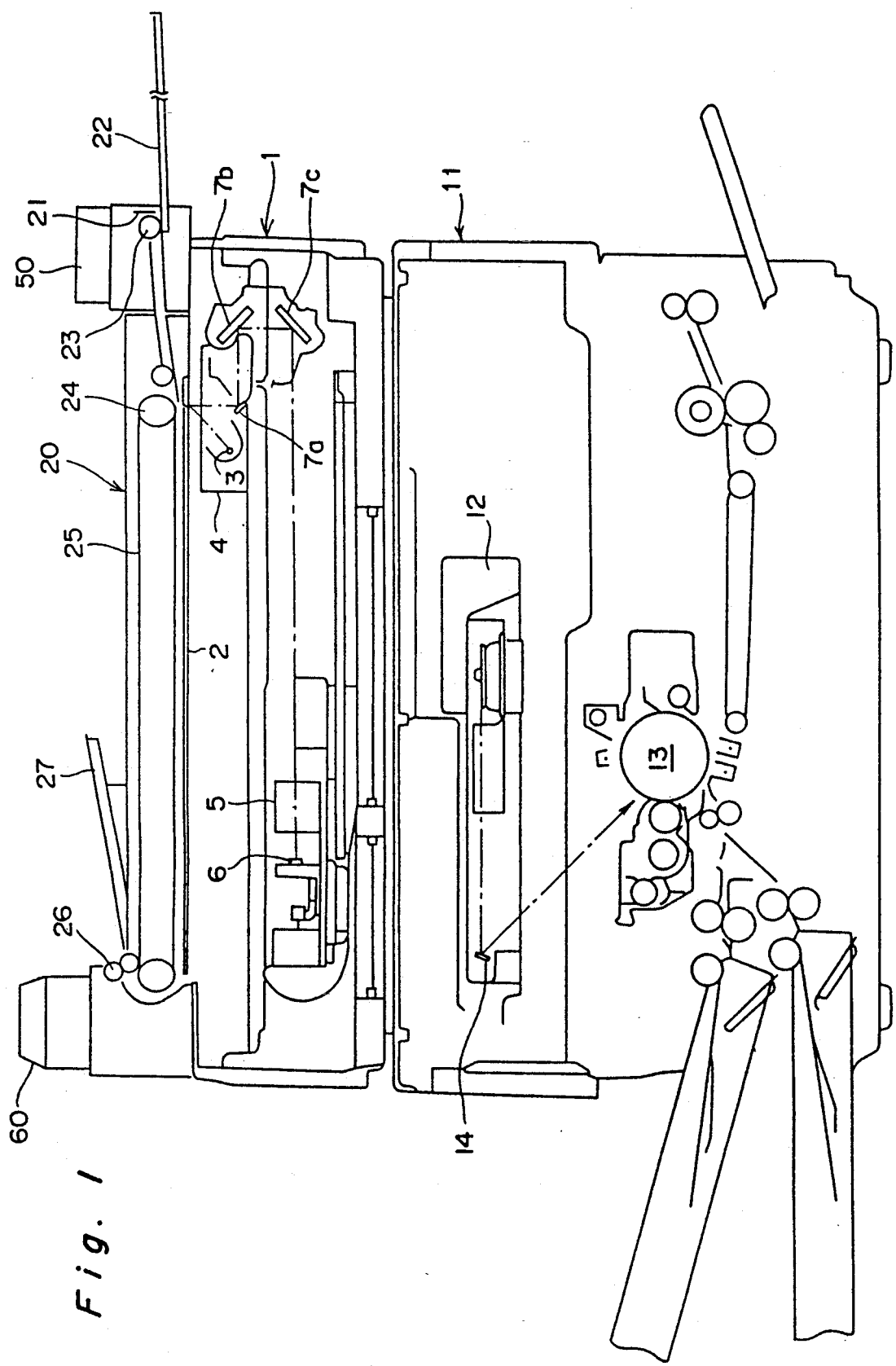
FIG. 1 is a cross sectional view of a facsimile apparatus according to a first preferred embodiment of the present invention.

FIG. 1 is a cross sectional view of the facsimile apparatus of the first preferred embodiment. The facsimile apparatus is roughly divided into a printer part 11 and a reading part 1 with an ADF unit 20. The reading part 1 is provided above the printer part 11. An operation panel 50 and a telephone set 60 are provided on the ADF unit 20.

An operation of the reading part 1 with ADF unit 20 will first be explained below.

Documents placed on a document tray 22 of the ADF unit 20 are detected by a document sensor 21, and are fed one by one to a predetermined position on a document glass 2 by rollers 23, 24 and a transfer belt 25. While the document placed on the document glass 2 is illuminated by a light source 3, the document is scanned by a moving scanner 4. The light reflected from the document is sequentially reflected by mirrors 7a, 7b and 7c and incident onto a linear CCD image sensor 6 through a lens 5. As will be described later in detail, an analogue output signal from the linear CCD image sensor 6 is converted into a digital signal, and further is binarized. After images of the documents are completely read, the documents are discharged out to a discharge tray 27 by the transfer belt 25 and a discharge roller 26.

In the meantime, in the printer part 11, generation of semiconductor laser beams is controlled by a laser optical system 12 according to the received facsimile signals. After the laser beams enter a photoreceptor 13 after being reflected by a mirror 14, development, transfer and fixing process of the images are carried out subsequently using an electrophotographic process known to those skilled in the art, whereby the images of the facsimile signals are printed on sheets of plain papers.

Since reading and printing in the reading part 1 and printer part 11 are performed in a manner similar to those in a conventional electrophotographic laser printer, the detailed description will be abbreviated here.

Figure 2:
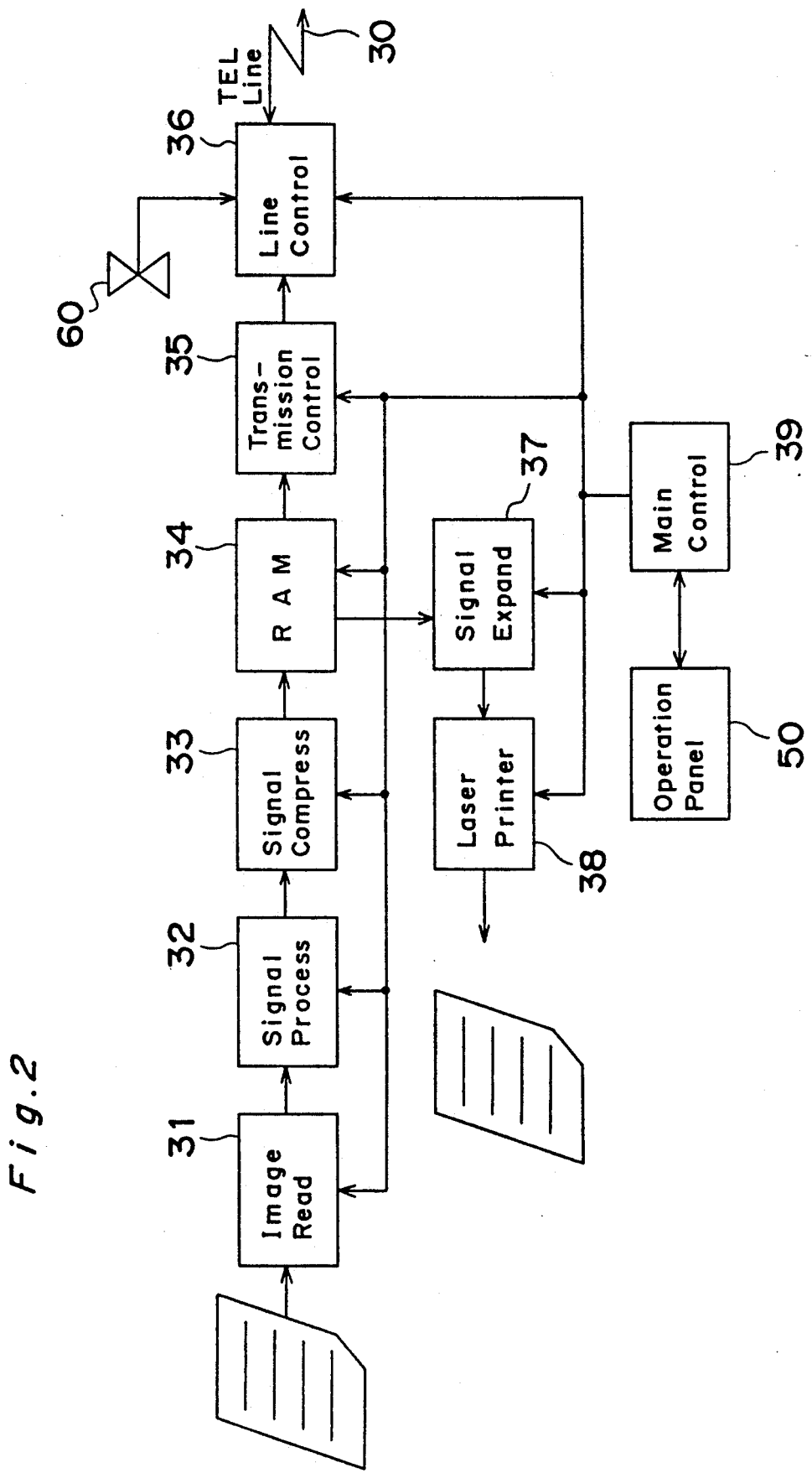
FIG. 2 is a schematic block diagram of the facsimile apparatus shown in FIG. 1.

FIG. 2 is a schematic block diagram showing a structure of the facsimile apparatus shown in FIG. 1.

Referring to FIG. 2, an image reading part 31 which is provided with the linear CCD image sensor 6 shown in FIG. 1 reads and converts the image of the document into image signals, and outputs the image signals to a signal processing part 32. The signal processing part 32 performs an analog to digital conversion of the image signals input thereto and also performs a correction process of the obtained data such as a γ transform process, and then, binarizes the data to output them as binary image data to a signal compressing part 33. After the signal compressing part 33. A compresses the binary image data according to a predetermined coding method such as a known MR coding method or MH coding method, makes the compressed image data stored in the RAM 34.

A transmission controlling part 35 has a modulator and a demodulator. In the transmission controlling part 35, a carrier wave signal is modulated according to the image data stored in RAM 34 using a predetermined modulating method, and the modulated facsimile signals are transmitted to a facsimile apparatus of the other destination party through a line controlling part 36 and a telephone line 30. Further, facsimile signals received from the facsimile apparatus of the other party through the telephone line 30 and line controlling part 36 are demodulated and converted into image data in the transmission controlling part 35. Then, the image data are stored in RAM 34.

The line controlling part 36 comprises a dialer and a network control unit (referred to as an NCU hereinafter) to connect or disconnect the telephone line when facsimile signals are transmitted to or received from the facsimile apparatus of the other party. Moreover, the telephone set 60 is connected with the line controlling part 36. When a telephone mode for speaking through the telephone set 60 is selected, the line controlling part 36 connects the telephone set 60 to the telephone line 30.

A signal expanding part 37 reads the received image data stored in RAM 34 and expands the image data, contrary to the operation of the signal compressing part 33, thereby obtaining image signals which are in turn output to a laser printer 38. The laser printer 38 prints images of the image signals on sheets of plain papers one by one as described earlier in accordance with the image signals input thereto.

A main controlling part 39 controls processes of the facsimile apparatus based on operator's commands input through the operation panel 50 as will be described in a detailed manner later. Moreover, instruction information for the operator and state information of the facsimile apparatus are output and displayed from the main controlling part 39 to the operation panel 50.

(b) Operation panel

Figure 3:
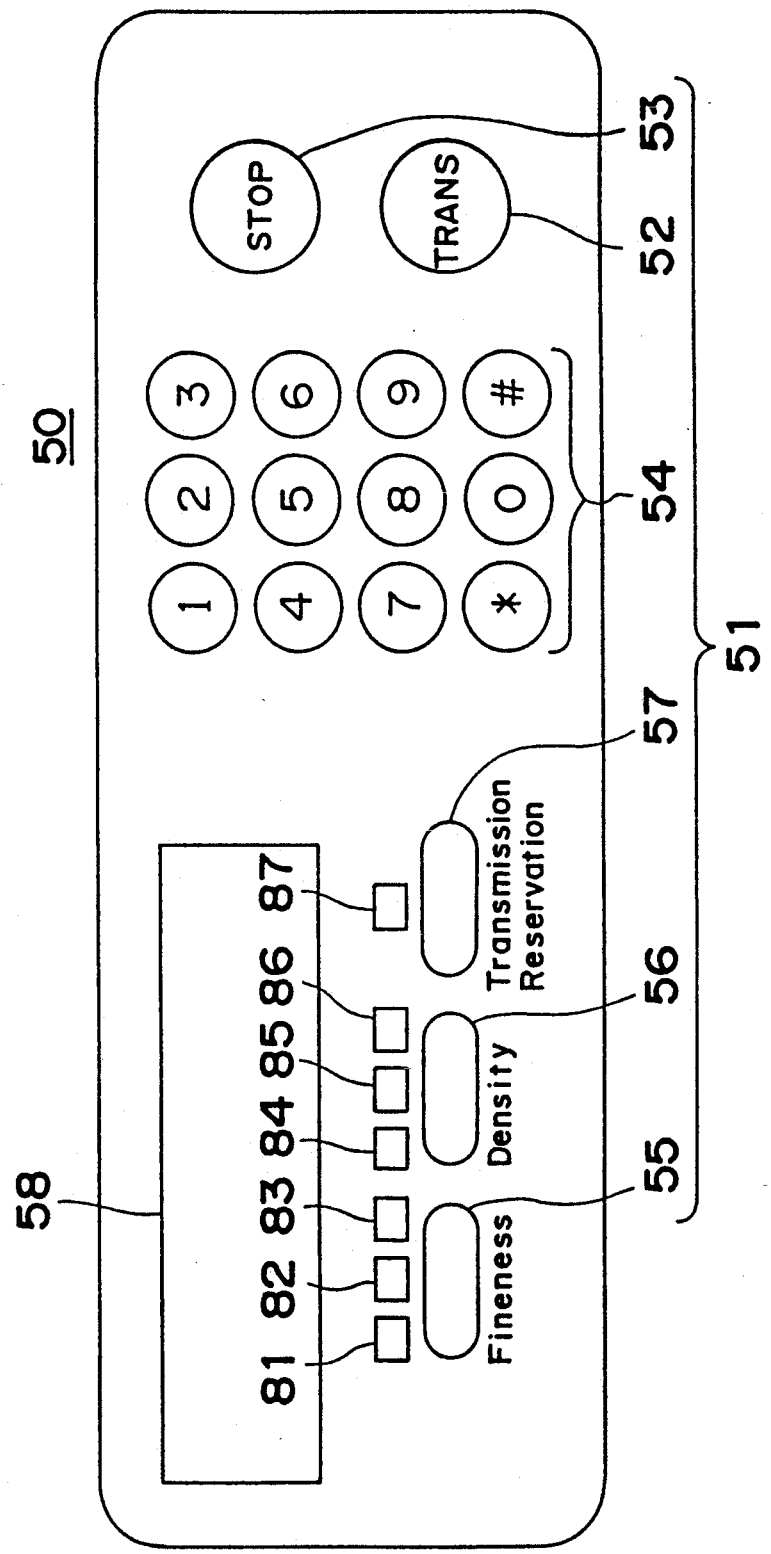
FIG. 3 is a front elevational view of an operation panel of the facsimile apparatus shown in FIG. 1.

FIG. 3 is a front elevational view of the operation panel 50 of the facsimile apparatus shown in FIG. 1.

Referring to FIG. 3, the operation panel 50 comprises a key matrix 51, three light emitting diodes (one of which is referred to as an LED hereinafter) 81, 82 and 83 for indicating set image finenesses upon reading, three LEDs 84, 85 and 86 for indicating set image densities upon reading and printing, an LED 87 for indicating that a transmission reservation mode has been set, and a liquid crystal display (referred to as an LCD hereinafter) 58 for displaying messages to the operator.

In the key matrix 51, there are provided a transmission key 52 for instructing transmission facsimile signals of images of documents placed on the document tray 22 after reading and converting the same to the facsimile signals, a stop key 53 for stopping reading images, transmitting or receiving facsimile signals, a telephone ten key 54 consisting of numeral keys from "0" to "9", an asterisk key "*" and a sharp key "#" for setting a facsimile number of a receiver party or the like, a fineness switching key 55, a density switching key 56 and a transmission reservation key 57 for setting the transmission reservation mode. When the fineness switching key 55 is depressed, the image fineness upon reading image is set to either one of normal, fine and super fine. If the density switching key 56 is depressed, the image density upon reading and printing is changed among thick, normal and thin. It is possible to change the operation mode the facsimile apparatus from the transmission reservation mode to a non-reservation mode, or from the non-reservation mode to the transmission reservation mode by one depression of the transmission reservation key 57.

In the drawings, the transmission key 52 is referred to as a TR key, and the transmission reservation key 57 is referred to as a TRRE key.

(c) Main controlling part

Figure 4:
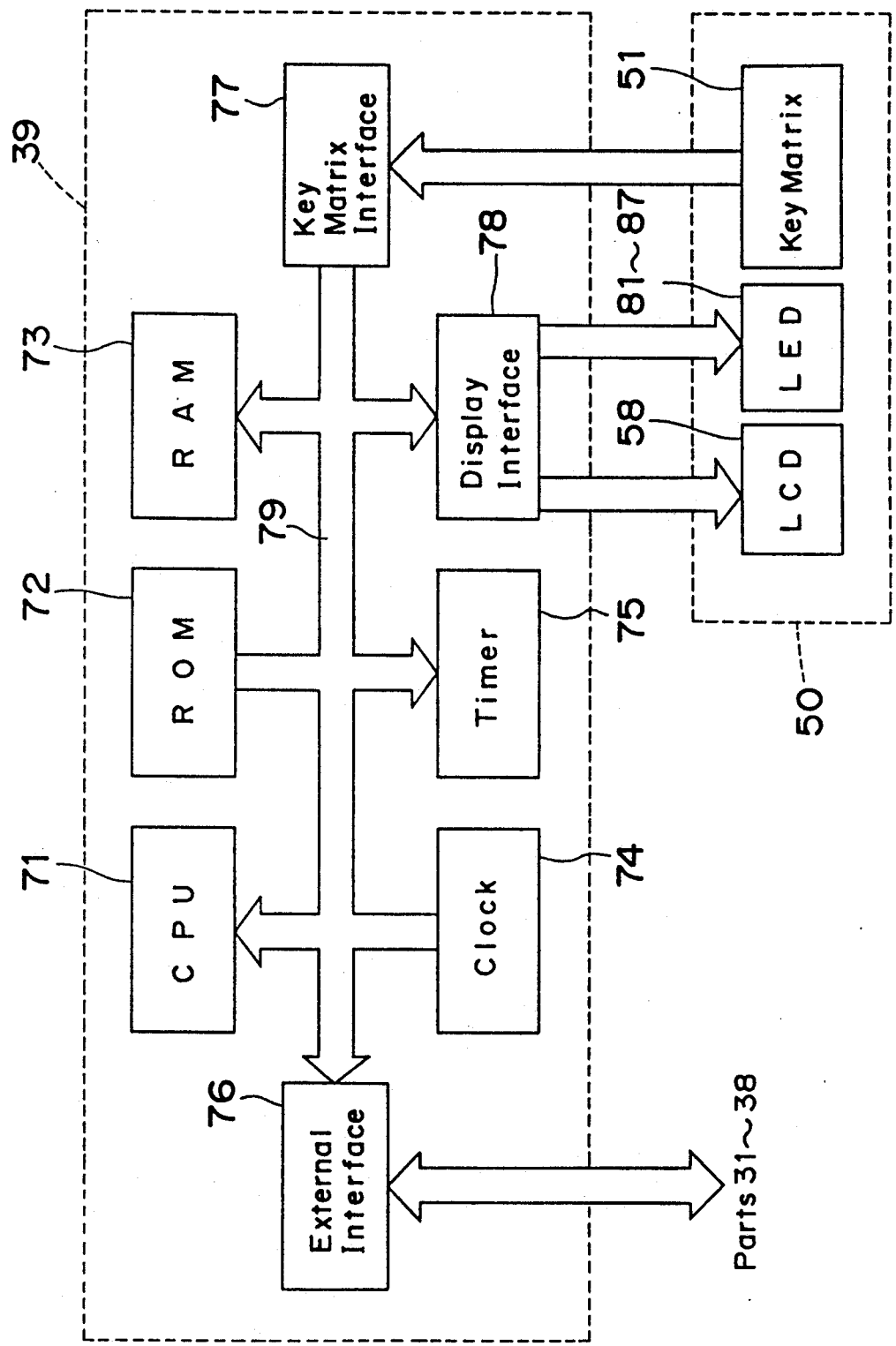
FIG. 4 is a schematic block diagram of a main controlling part of FIG. 2 and the operation panel shown in FIG. 3.

FIG. 4 is a schematic block diagram showing the main controlling part 39 shown in FIG. 2 and operation panel 50 shown in FIG. 3.

Referring to FIG. 4, the controlling part 39 comprises a central processing unit (referred to as a CPU hereinafter) 71 which controls the operation of the facsimile apparatus shown in FIGS. 1 and 2, a read only memory (referred to as a ROM hereinafter) 72 for storing a system program for the CPU 71 and data necessary to execute the system program, a RAM 73 for storing controlling parameters, flags and various kinds of data for executing the above system program, a clock circuit 74 for counting the current time, and a timer circuit 75 which counts a predetermined time and outputs an interruption signal to the CPU 71 when the predetermined time lapses.

The main controlling part 39 further includes an external interface circuit 76 connected to respective parts 31-38 shown in FIG. 2, a key matrix interface circuit 77 connected to the key matrix 51 of the operation panel 50, and a display interface circuit 78 connected to LEDs 81-87 and LCD 58.

These parts 71 through 78 are connected with each other within the main controlling part 39 via an internal bus 79.

The RAM 73 stores the parameters, a flag and data required for executing the system program as follows;

(1) CMP: a controlling mode parameter indicative of one of the operating modes which is set for the facsimile apparatus;

(2) TRF: a transmission reservation flag to indicate whether or not a transmission reservation is set;

(3) ISP1: an inner state parameter to control the processing order in a document transmitting process described later (with reference to FIGS. 9a to 9e);

(4) ISP2: an inner state parameter to control the processing order in a transmission reserving process described later (with reference to FIG. 10);

(5) facsimile numbers of a party now in communication and a party to be connected in succession; and (6) information of the image density upon reading and printing and the image fineness upon reading which are set at present.

(d) Processes of facsimile apparatus (d-1) Main routine

Figure 5:
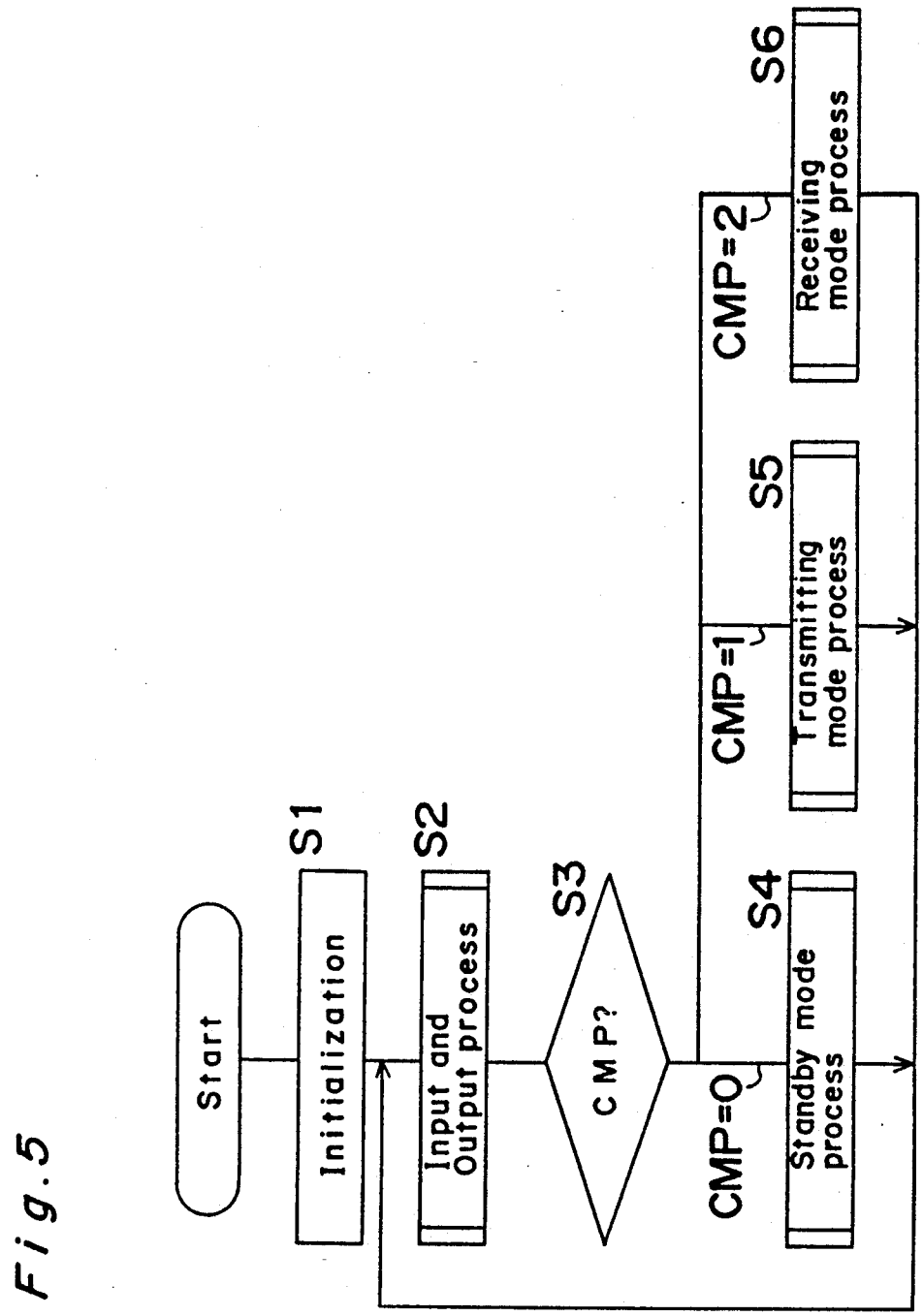
FIG. 5 is a flow chart of a main routine executed by the controlling part shown in FIG. 4.

FIG. 5 is a flow chart of a main routine executed by the main controlling part shown in FIG. 4.

Referring to FIG. 5, when the facsimile apparatus is turned ON thereby starting the main routine, first of all, initialization is carried out in step S1. That is, the aforementioned controlling mode parameter CMP, the transmission reservation flag TRF and the inner state parameters ISP1 and ISP2 are reset to 0. Thereafter, in the inputting and outputting process of step S2, the transmission reservation flag TRF is set and the LED 87 is turned on or off in response to the depression of the transmission reservation key 57, and a facsimile number of a destination receiver party is set.

Thereafter, the controlling mode parameter CMP is checked in step S3. When the controlling mode parameter CMP is 0, the program flow proceeds to step S4, wherein the standby mode process is carried out to set the controlling mode parameter CMP depending on whether or not transmission conditions are satisfied and whether or not a facsimile signal is received from a facsimile apparatus of the other party. Then, the program flow returns to step S2.

If the controlling mode parameter CMP is 1 in step S3, the program flow moves to step S5 to carry out the transmitting mode process which will be described later. The program flow then moves from step S5 to step S2.

Furthermore, if the controlling mode parameter CMP is 2 in step S3, the program flow goes to step S6. After the receiving mode process is performed in step S6, the program flow returns to step S2. In the receiving mode process, in an operation similar to the operation of the conventional apparatus, the line is connected with a facsimile apparatus of an outgoing party, a facsimile signal is received therefrom, the facsimile signal is converted into image signals and images thereof are printed.

(d-2) Inputting and outputting process

Figure 6:
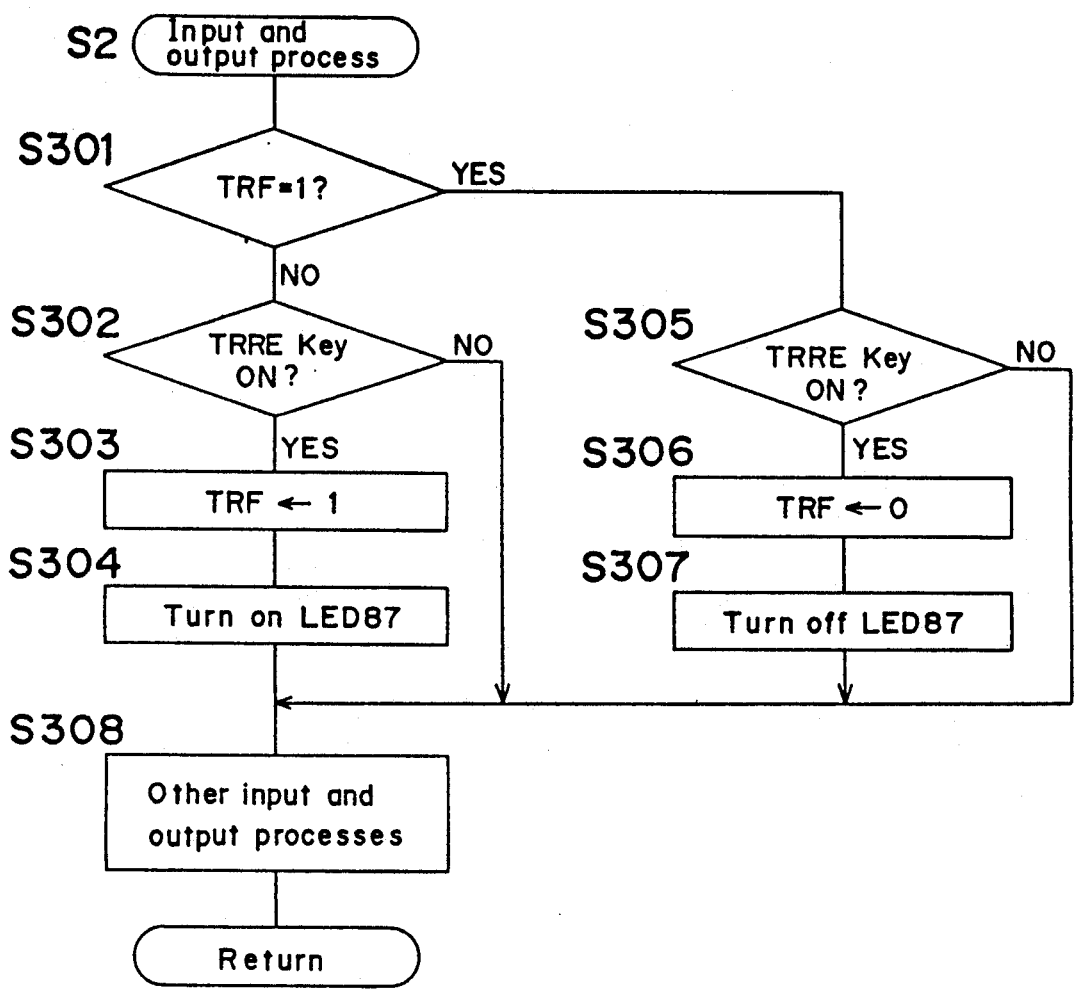
FIG. 6 is a flow chart of an inputting and outputting process of a subroutine shown in FIG. 5.

A flow chart of FIG. 6 shows the inputting and outputting process (step S2) of FIG. 5.

As shown in FIG. 6, whether or not the transmission reservation flag TRF is 1 is checked in step S301. As described above, the transmission reservation flag TRF is reset to 0 in the initialization process. When the transmission reservation flag TRF is not 1 (NO in step S301), it is checked in step S302 whether the transmission reservation key 57 is turned ON. If the transmission reservation key 57 is turned ON (YES in step S302), the transmission reservation flag TRF is set to 1 in step S303, and then, the LED 87 of the operating panel 50 is turned on in step S304. Thereafter, the program flow moves to step S308. If the transmission reserving key 57 is not turned ON (NO in step S302), the program flow goes directly to step S308.

On the other hand, if the transmission reservation flag TRF is 1 (YES in step S301), the program flow advances to step S305 to check whether the transmission reserving key 57 is turned ON. In the case of the transmission reserving key 57 being turned ON (YES in step S305), the transmission reservation flag TRF is set to 0 in step S306, and then, the LED 87 of the operating panel 50 is turned OFF in step S307. Then, the program flow moves to step S308. If the transmission reserving key 57 is not turned ON (NO in step S305), the program flow moves directly from the step S305 to step S308.

In step S308, the inputting process for the other various keys of the operation panel 50 and sensors is carried out as well as the outputting process for display of the operating panel 50 etc. In the case where a facsimile number of a destination receiver party is input using the ten key 54 of the operation panel 50 in step S308, the data of the facsimile number is stored in the RAM 73. After the inputting and outputting process of step S308, the program flow returns to the main routine.

(d-3) Standby mode process

Figure 7:
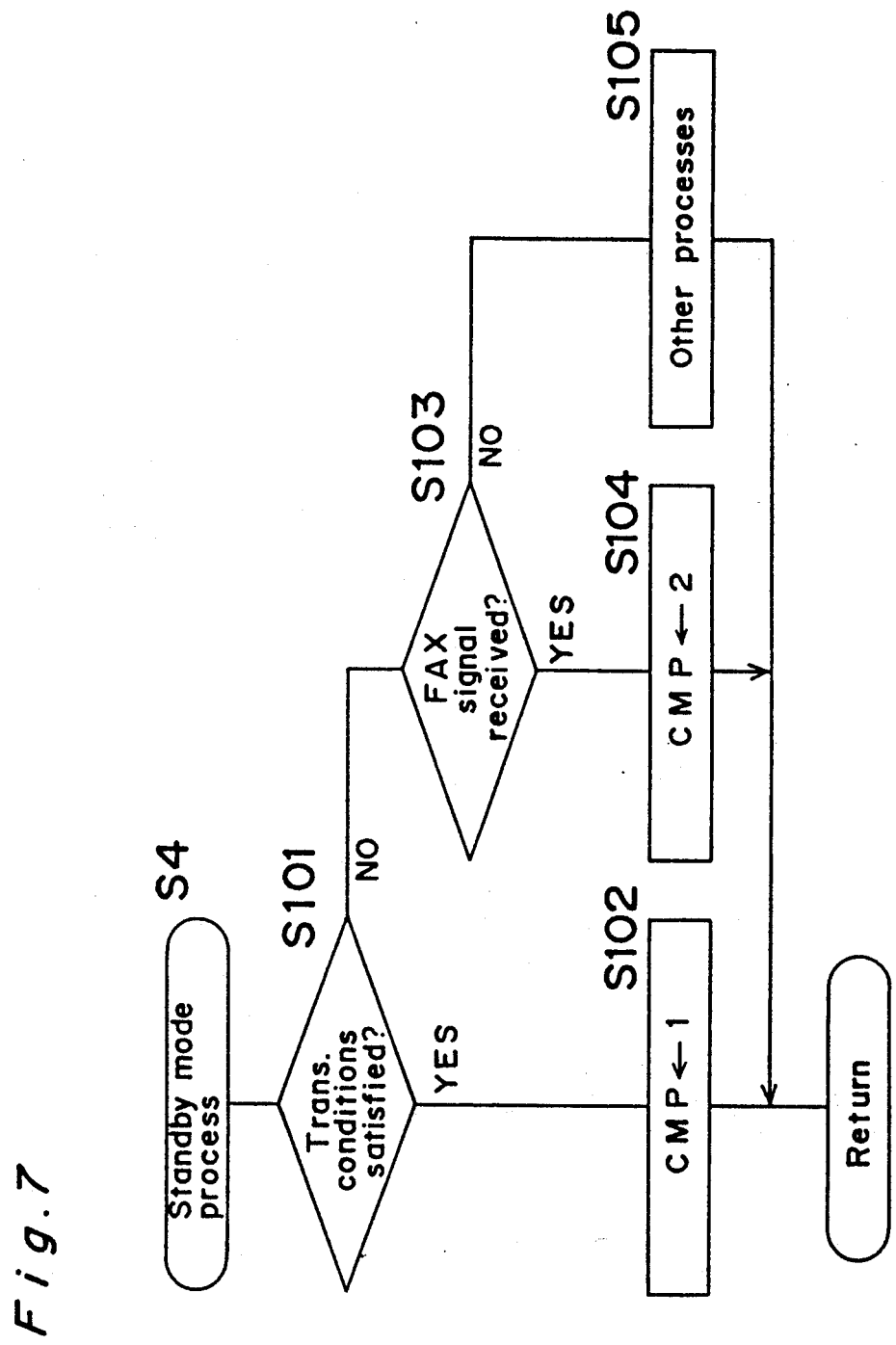
FIG. 7 is a flow chart of a standby mode process of a subroutine shown in FIG. 5.

FIG. 7 is a flow chart of the standby mode process (step S4) shown in FIG. 5.

Referring to FIG. 7, in the first step S101, it is checked whether transmitting conditions are satisfied. When all the procedures described below are completed, it is so judged that the transmitting conditions are satisfied. That is, (1) the document is placed on the document tray 22 by the operator, and this fact is detected by the document sensor 21;

(2) a facsimile number of a destination receiver party is input using the ten key 54 and data of the input facsimile number are stored in the RAM 73; and (3) the transmission key 52 is pressed.

When it is judged that the transmitting conditions have been satisfied in step S101 (YES in step S101), the controlling mode parameter CMP is set to 1 in step S102, and then, the program flow goes back to the main routine. Meanwhile, if it is judged that the transmitting conditions are not satisfied in step S101 (NO in step S101), the program flow proceeds to step S103, and then, it is checked whether or not a calling tone of a reception request signal is received from a facsimile apparatus of an outgoing party. When the calling tone of the reception request signal is received (YES in step S103), the controlling mode parameter CMP is set to 2 in step S104, and then, the program flow returns to the main routine. On the other hand, without receiving the calling tone of the reception request signal (NO in step S103), the other procedures are executed in step S105 and the program flow returns to the main routine.

(d-4) Transmitting mode process

Figure 8:
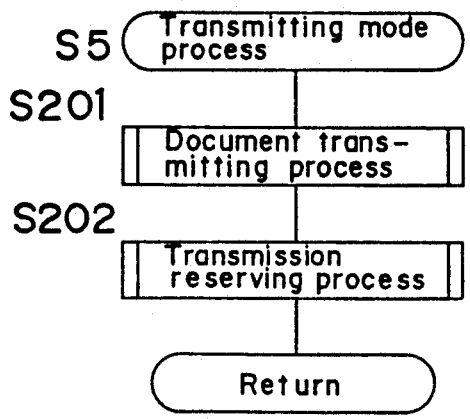
FIG. 8 is a flow chart of a transmitting mode process of a subroutine shown in FIG. 5.

FIG. 8 is a flow chart of the transmitting mode process (step S5) shown in FIG. 5.

As shown in FIG. 8, in step S201, there is performed a process for reading document images and storing image data thereof in the RAM 34, a process for connecting with a facsimile apparatus of a destination receiver party through the telephone line, a process for transmitting the image data thereto, and a process for disconnecting the telephone line. That is, a document transmitting process is carried out in step S201. In the succeeding step S202, a facsimile number of a third party to be communicated next to the current receiver party is input during the communication with the receiver party, i.e., a transmission reserving process is performed. Then, the program flow goes back to the main routine.

FIGS. 9a to 9e are flow charts of the document transmitting process (step S201) shown in FIG. 8.

Figure 9A:
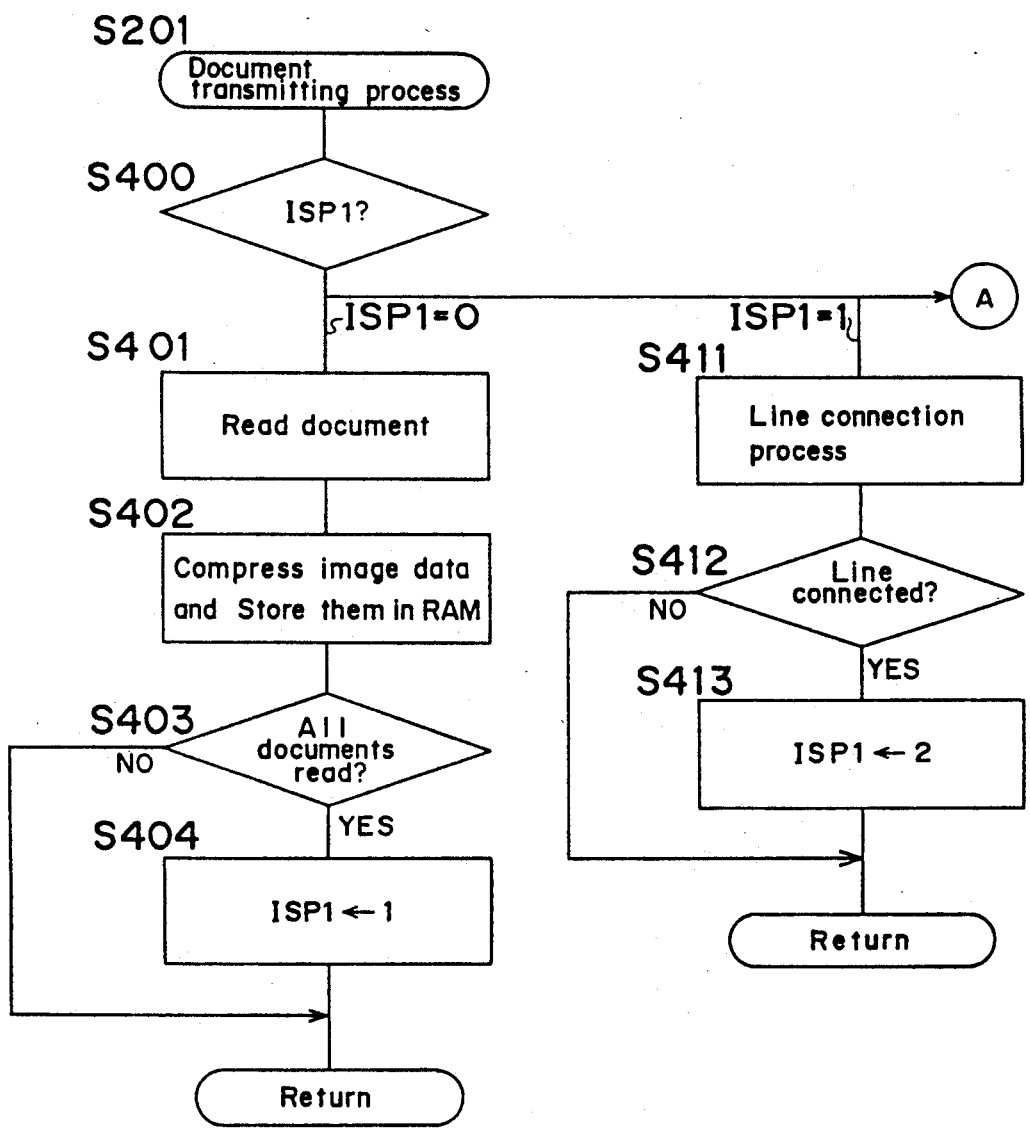
FIGS. 9a to 9e are flow charts of a document transmitting process of a subroutine shown in FIG. 8.

With reference to FIG. 9a, the inner state parameter ISP1 is checked in step S400. When the inner state parameter ISP1 indicates 1, 2, 3, 4, 5, the program flow proceeds to steps S401, S411, S421 of FIG. 9b, S431 of FIG. 9c, S441 of FIG. 9d and S451 of FIG. 9e, respectively.

In step S401, a document placed on the document tray 22 is fed onto the document glass 2 of the reading part 1, so that an image of the document is read and converted into image data. Thereafter, the converted image data are compressed and stored in RAM 34 in step S402.

In step S403, it is detected whether the images of all the documents placed on the document tray 22 are read and stored in RAM 43. If reading of all the document images is completed (YES in step S403), the program flow goes to step S404. After the inner state parameter ISP1 is updated to 1 in step S404, the program flow returns to the original routine. On the other hand, if all the document images are not completely read (NO in step S403), the program flow returns to the original routine directly from step S403.

In step S411, there is performed a line connection process of the facsimile apparatus for connecting the transmission controlling part 35 through the line controlling part 36 and the telephone line 30 to a facsimile apparatus of a destination or receiver party in a predetermined manner of the facsimile apparatus. Subsequently in step S412, if the line connection process is completed (YES in step S412), the inner state parameter ISP1 is set to 2 in step S413, and then, the program flow goes back to the original routine. In contrast, when the line connection process is not finished (NO in step S412), the program flow goes back to the original routine.

Figure 9B:
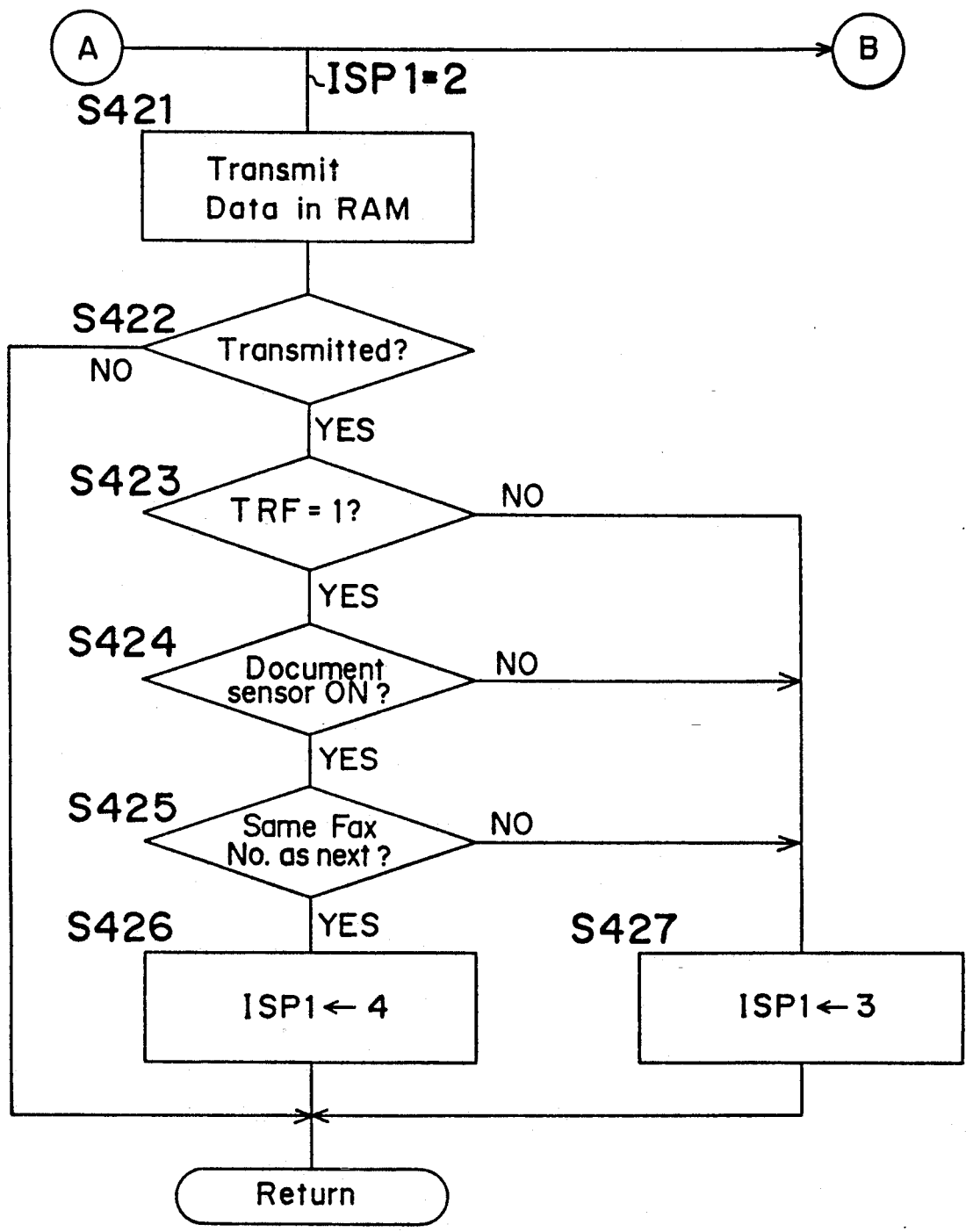

Referring to FIG. 9b, the image data stored in RAM 34 are read out and transmitted in step S421. Thereafter, it is checked in step S422 whether the transmission of the image data is completed. The program flow goes to step S423 after the image data are completely transmitted (YES in step S422), whereas the program flow returns to the original routine when the image data are not completely transmitted (NO in step S422).

In steps S423, S424 and S425, it is detected whether or not the transmission reservation flag TRF is 1, whether or not the document sensor 21 of the ADF unit 20 is kept ON and whether or not the facsimile number of the party stored in RAM 73 and presently in communication with the party is the same as the facsimile number of a third party appointed for the succeeding communication, respectively. If the transmission reservation flag TRF is 1 (YES in step S423), the document sensor 21 of the ADF unit 20 is turned ON (YES in step S424) and the facsimile number of the party currently communicating with here is the same as the facsimile number of the reserved next party (YES in step S425), the inner state parameter ISP1 is set to 4 in step S426 to be updated, and then, the program flow returns to the original routine. Meanwhile, if the transmission reservation flag TRF is 0 (NO in step S423) and the document sensor 21 of the ADF unit 20 is held OFF (NO in step S424), or the facsimile number of the current other party is not coincident with the facsimile number of the reserved next party (NO in step S425), the inner state parameter ISP1 is updated to 3 in step S427. Then, the program flow returns to the original routine.

Figure 9C:
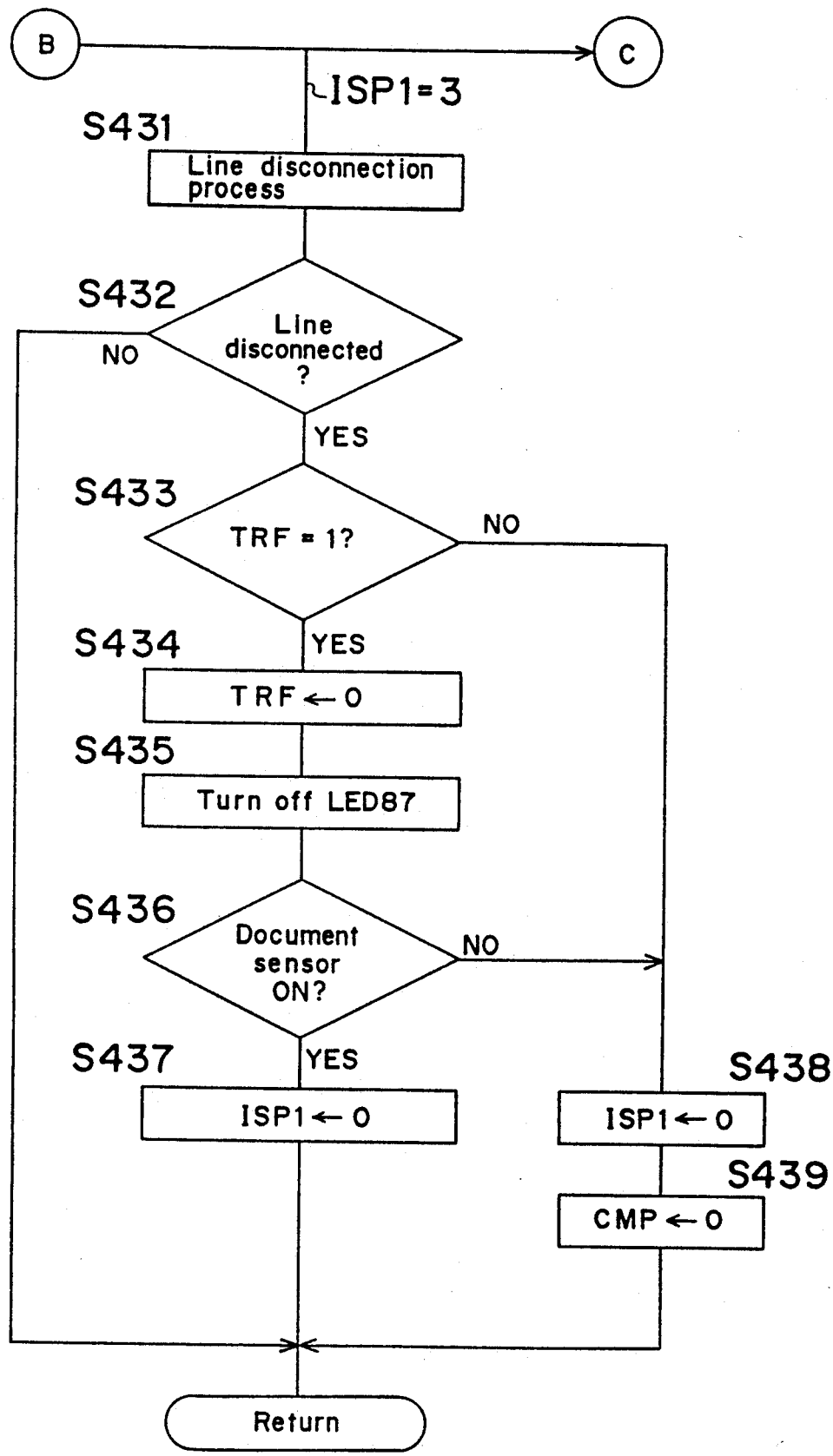

As shown in step S431 of FIG. 9c, according to a predetermined procedure, there is performed a line disconnection process for disconnecting the transmission controlling part 35 from the facsimile apparatus of the receiver party connected through the telephone line 30 in step S411. Whether or not the line disconnection process is completed in the following step S432. If the line disconnection process is not completed (NO in step S432), the program flow returns to the original routine. However, if the line disconnection program is completed (YES in step S432), the program flow proceeds to step S433 to check whether or not the transmission reservation flag TRF is 1.

When the transmission reservation flag TRF is 1 (YES in step S433), the transmission reservation flag TRF is reset to 0 in step S434 thereby canceling the transmission reserving mode. Subsequently, after the LED 87 is turned OFF in step S435, the program flow goes to step S436. On the other hand, when the transmission reservation flag TRF is 0 (NO in step S433), the program flow skips over to step S438.

If it is detected in step S436 that the document sensor 21 of the ADF unit 20 is turned ON (YES in step S436), the inner state parameter ISP1 is reset to 0 in step S437, with the program flow returning to the original routine. On the contrary, if the document sensor 21 is turned OFF (NO in step S436), the program flow moves to step S438 and the inner state parameter ISP1 is reset to 0. Thereafter, the controlling mode parameter CMP is reset to 0 in step S439 and the program flow returns to the original routine.

Figure 9D:
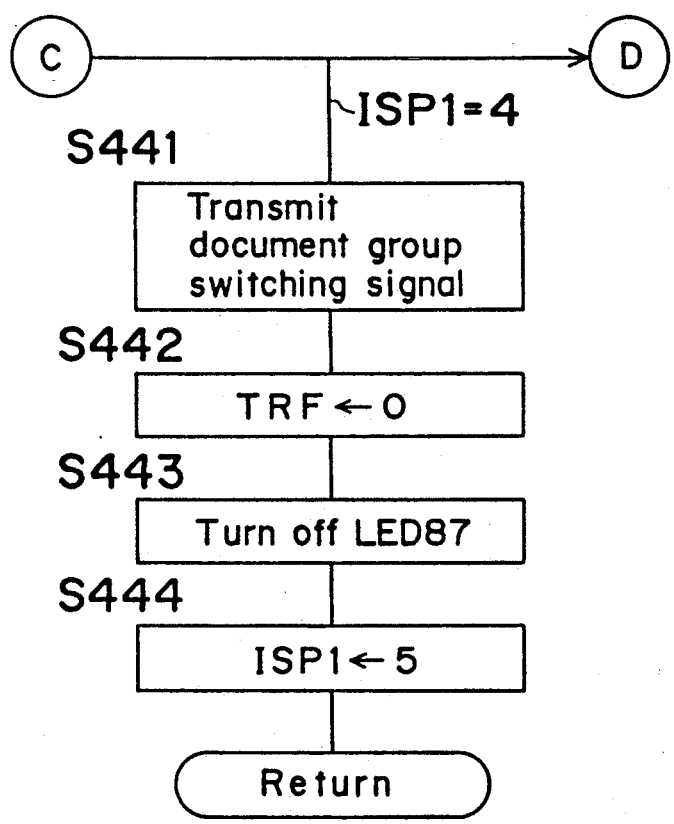

As shown in step S441 of FIG. 9d, a document group switching signal is sent to the facsimile apparatus of the current receiver party. The document group switching signal indicates a boundary between the image data which are transmitted in step S421 and the image data which are to be transmitted in step S452 in succession to the above image data without performing any line disconnection process. Thereafter, the transmission reservation flag TRF is reset to 0 in step S442, and the LED 87 is turned off in step S443 and the inner state parameter ISP1 is set to 5 in step S444. Then, the program flow returns to the original routine.

Figure 9E:
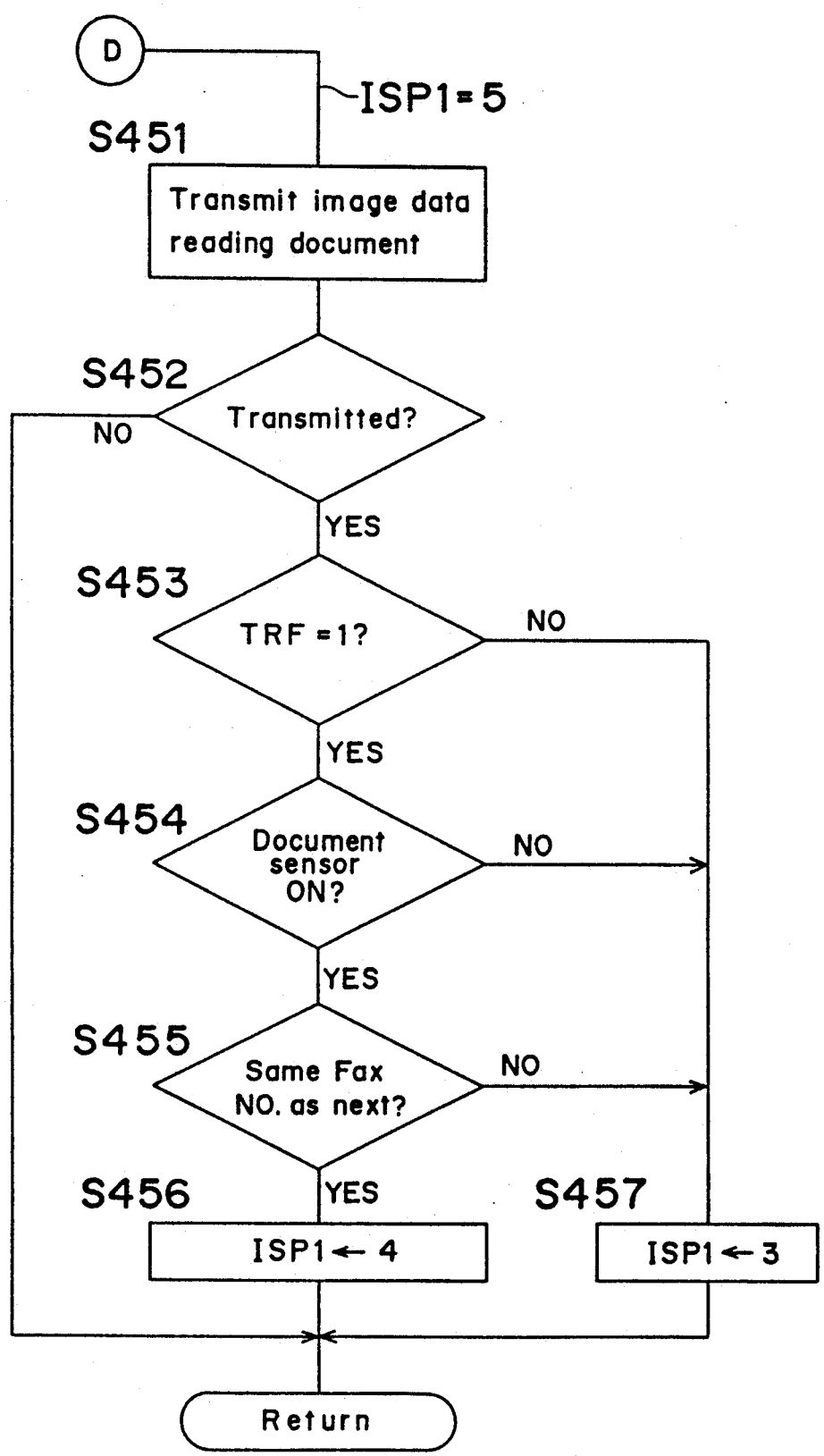

As shown in step S451 of FIG. 9e, there is performed the compression process reading images of documents set on the document tray 22, thereby converting image data thereof into facsimile signals, and then, the facsimile signals are transmitted to the facsimile apparatus of the receiver party. The RAM 34 is used as a buffer memory for storing the image data temporarily. Subsequently, it is detected in step S452 whether or not the transmission of the subject image data is finished. When the transmission thereof is completed (YES in step S452), the program flow moves to step S453. If the transmission is not completed (NO in step S452), the program flow goes back to the original routine.

In steps S453, S454 and S455, it is checked respectively whether or not the transmission reservation flag TRF is 1, whether or not the document sensor 21 of the ADF unit 20 is turned ON and whether or not the facsimile number of the current party and that of the reserved next party which are both stored in RAM 73 are equal to each other. When the transmission reservation flag TRF is 1 (YES in step S453), the document sensor 21 of the ADF unit 20 is turned ON (YES in step S454) and also, the facsimile numbers of the current party and the reserved next party are the same (YES in step S455), the inner state parameter ISP1 is updated to 4 in step S456, and the program flow returns to the original routine. On the contrary, if the transmission reservation flag TRF is 0 (NO in step S453) and the document sensor 21 is turned OFF (NO in step S454), or the facsimile numbers of the both parties are not coincident (NO in step S455), the inner state parameter ISP1 is set to 3 in step S457 and the program flow goes back to the original routine.

Figure 10:
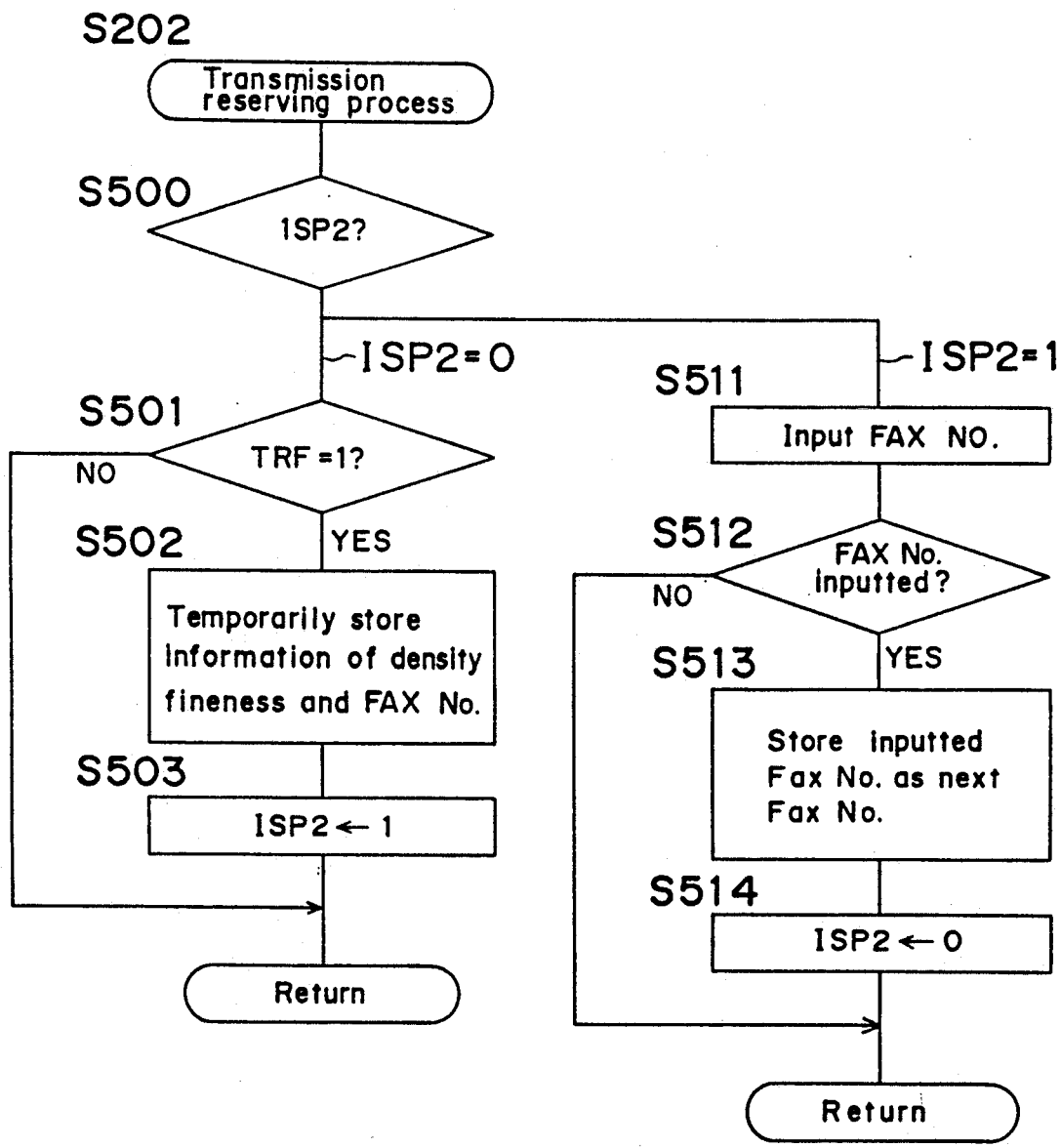
FIG. 10 is a flow chart of a transmission reserving process of a subroutine shown in FIG. 8.

FIG. 10 is a flow chart of the transmission reserving process (step S202) shown in FIG. 8.

As shown in FIG. 10, the inner state parameter ISP2 is checked in step S500. When the inner state parameter ISP2 is 0 or 1, the program flow goes to step S501 or step S511.

In step S501, it is detected whether or not the transmission reservation flag TRF is 1. When the transmission reservation flag TRF is 1, the presently-set image printing density and image reading fineness and the facsimile number of the current party are temporarily stored in the RAM 73 in step S502. Thereafter, the inner state parameter ISP2 is set to 1 in step S503, and then, the program flow goes back to the original routine. If the transmission reservation flag TRF is 0 (NO in step S501), the program flow directly returns to the original routine.

After a facsimile number of a party to be reserved is input using the ten key 54 of the operation panel 50 in step S511, it is detected in step S512 whether or not the facsimile number thereof is completely input. When the subject facsimile number is completely input (YES in step S512), the program flow advances to step S513, wherein the input facsimile number is stored as the facsimile number of the reserved party to be connected next to the current receiver party in the RAM 73. In the next step S514, the inner state parameter ISP2 is reset to 0, with the program flow returning to the original routine. On the other hand, if the facsimile number of the party to be reserved is not completely input (NO in step S512), the program flow goes back to the original routine directly.

According to the first preferred embodiment, when first image data stored in the RAM 34 are transmitted reading out them from the RAM 34 after reading images of the first documents and storing the first image data thereof in the RAM 34, if a facsimile number of a party reserved to transmit image data of second documents before transmission of the image data of the first documents is completed is judged to be the same as the facsimile number of the current receiver party, the image data of the second documents are transmitted to the reserved next party in succession to the image data of the first documents without preforming the line disconnection process with the facsimile apparatus of the party which communicates with this facsimile apparatus. However, the present invention is not limited to the above preferred embodiment, but is applicable to the following modifications.

Specifically, the image data of the first documents may be transmitted reading the images of the first documents without being stored in the RAM 34. Further, when the transmission of the second image data is reserved, the second image data to be transmitted in addition to the first image data may be previously stored in the RAM 34, and thereafter, the second image data may be transmitted to the facsimile apparatus of the reserved next party reading out them from the RAM 34 in succession to completion of the transmission of the first image data.

The transmission of the second image data may be reserved at any time so long as it is before the first image data are completely transmitted after the start of the transmission thereof. Moreover, the coincidence of the facsimile numbers of the parties to which the first and second image data are transmitted may be judged at any time after the transmission instruction for the first image data (the immediate transmission by the transmission key 52) or the transmission reservation therefor and the transmission instruction or the transmission reservation for the second image data are both completed and before the transmission of the first image data is completed.

Second Preferred Embodiment

A facsimile apparatus according to a second preferred embodiment of the present invention will be discussed below in an order of the following items, with reference to the accompanying drawings.
(a) Operation panel
(b) Main controlling part
(c) Processes of facsimile apparatus
  (c-1) Main routine
  (c-2) Inputting and outputting process
  (c-3) Transmission request checking process
  (c-4) Standby mode process
  (c-5) Transmitting mode process In the second preferred embodiment, an immediate transmission, a transmission reservation, a timer reservation and a retransmission will be defined as below.

(1) Immediate transmission: the facsimile apparatus is not communicating at present, and it reads images of documents and transmits image data thereof immediately to a facsimile apparatus of the other party;

(2) Transmission reservation: the facsimile apparatus is now communicating, and in order to transmit further image data immediately in succession to the current communication, it reads images of documents and temporarily store image data thereof in the RAM 34, and thereafter, transmitting the further image data after the above-mentioned communication;

(3) Timer reservation: in order to transmit image data at a time appointed by the operator (referred to as to a transmission appointing time hereinafter) independent of whether the facsimile apparatus is now communicating or not, the facsimile apparatus reads images of documents and temporarily stores image data thereof, and thereafter, transmits the image data at the above transmission appointing time;

(4) Retransmission: in the case where the line connection with a desired receiver party through the telephone line is not achieved in the above transmission (1) through (3), a preset number of retrials or retails are repeated a predetermined time later to connect the line again.

Although the facsimile apparatus of the second preferred embodiment is formed in the same structure as that illustrated in FIGS. 1 and 2, the following points are characteristics of the second preferred embodiment in comparison with the first preferred embodiment shown in FIGS. 1 and 2.

(1) There is provided on an operation panel 50a a timer reservation key 59 and an LED 88 for indicating that the timer reserving mode is selected.

Figure 19A:
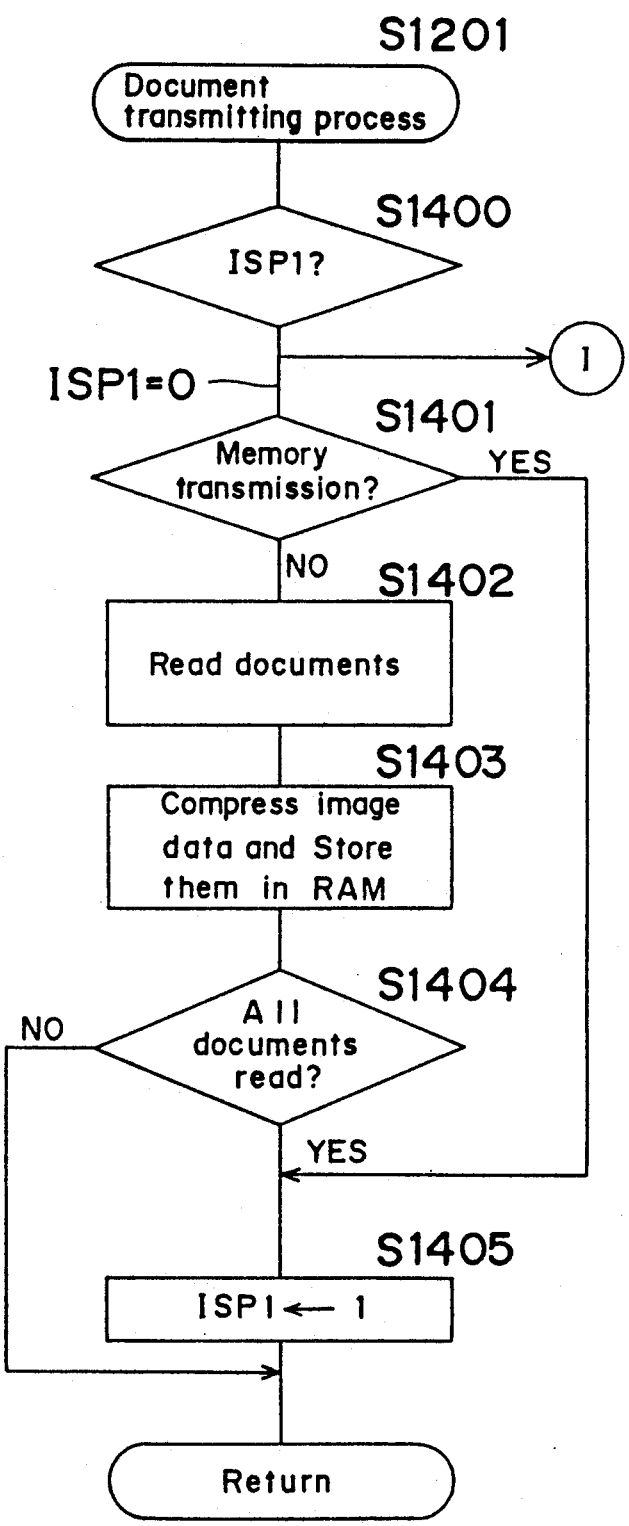
FIGS. 19a to 19h are flow charts of a document transmitting process of a subroutine shown in FIG. 18.
Figure 19B:
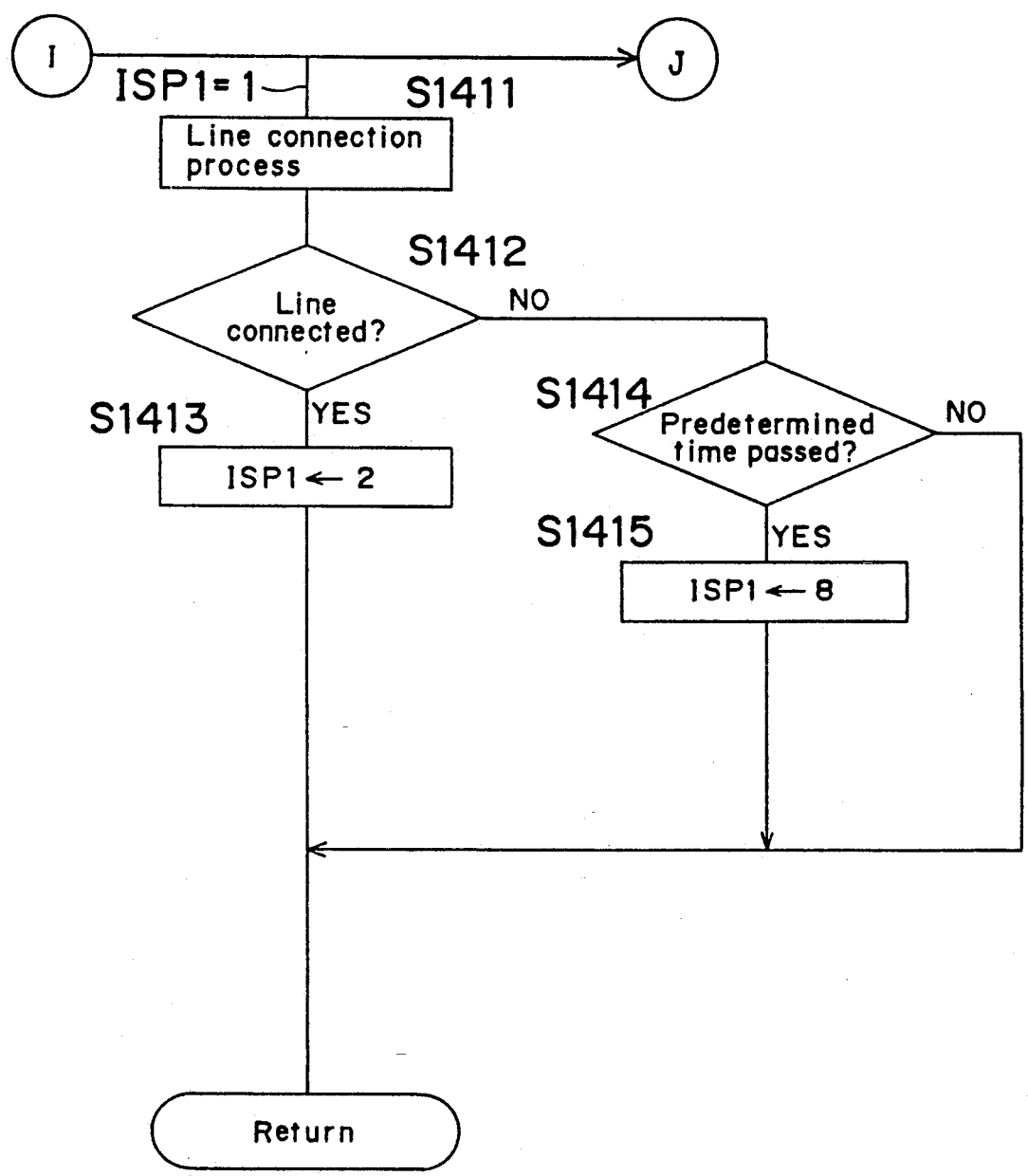
Figure 19C:
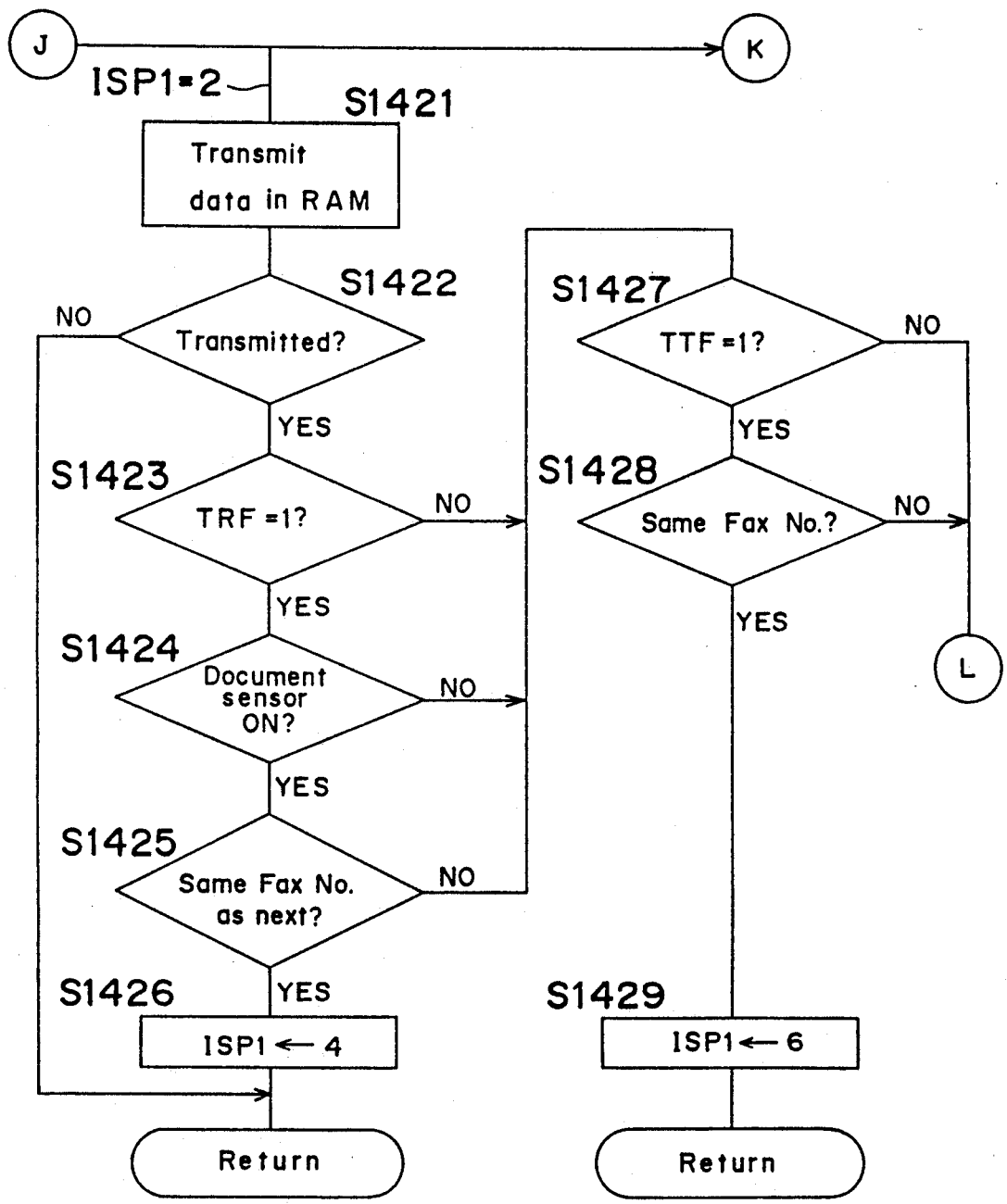

(2) The facsimile apparatus of the second preferred embodiment operates in a different manner from that of the first preferred embodiment as follows:

(2-1) When a facsimile number of the current other party is coincident with a facsimile number of a party reserved by the timer reservation or for waiting for a retransmission, image data to be transmitted by the timer reservation or after waiting for the retransmission are transmitted in succession to the current communication without performing the line disconnection process (See the document transmitting process shown in FIG. 19c);

(2-2) When the facsimile apparatus tries to transmit the first image data to a facsimile apparatus of the other party but can not be connected therewith through the telephone line, if the facsimile number of the other party to which the first image data are to be transmitted is the same as that of a party for waiting for a retransmission of the second image data, the first and second image data are transmitter together with each other, namely, in a batch transmission, in the next retransmission (See the document transmitting process shown in FIGS. 19a to 19h); and (2-3) If a facsimile number of the other party reserved by the timer reservation is agreed with a facsimile number of another party already registered by the transmission reservation, the timer reservation or waiting for the retransmission, it is entrusted to the operator to judge whether or not image data to be reserved by the timer reservation is to be continuously transmitted together with the already reserved image data by a batch transmission, at the already reserved or appointed transmission time. If the operator wishes to perform the batch transmission, these image data are transmitted at the above transmission time without performing the line disconnection process (See a timer reservation process shown in FIGS. 17a to 17c).

(a) Operation panel

Figure 11:
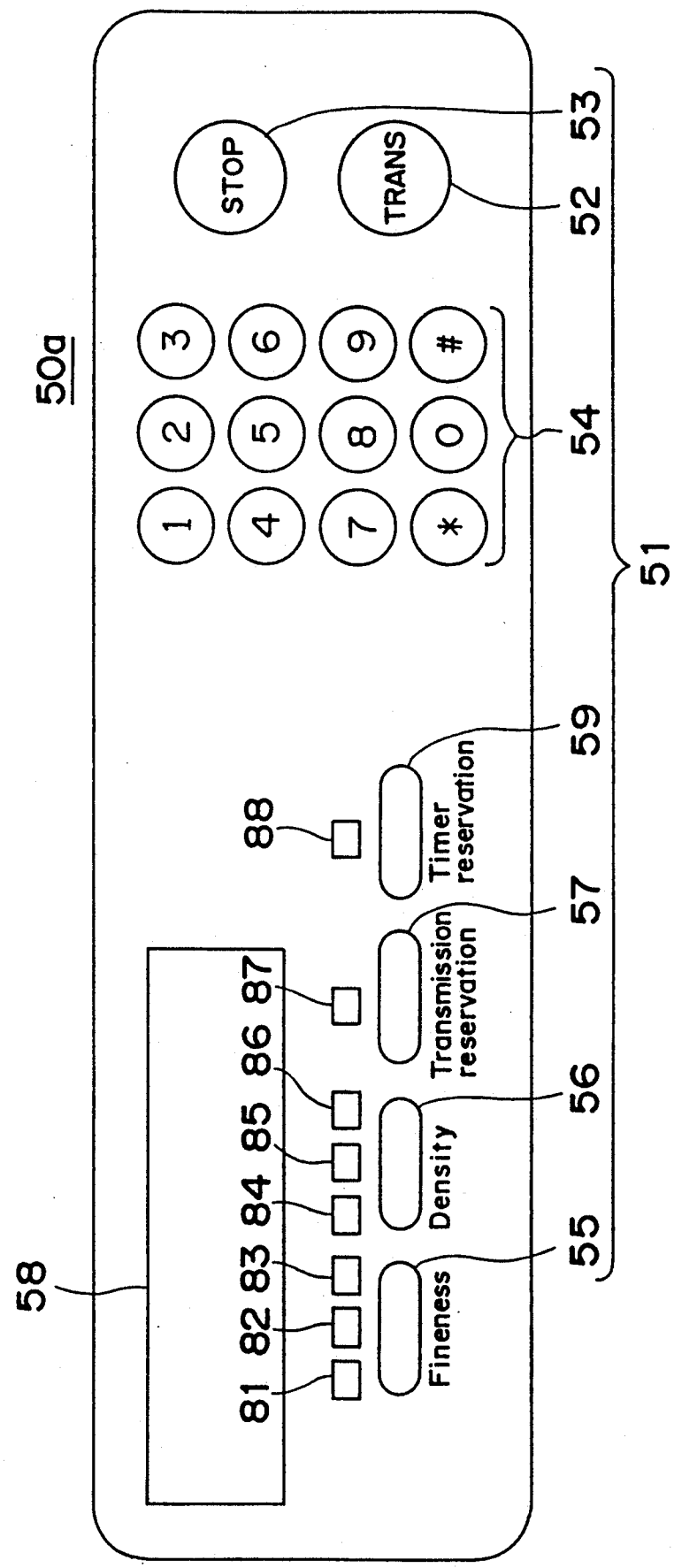
FIG. 11 is a front elevational view of an operation panel of a facsimile apparatus according to a second preferred embodiment of the present invention.

FIG. 11 is a front elevational view of the operation panel 50a of the facsimile apparatus of the second preferred embodiment.

As shown in FIG. 11, there are provided a timer reservation key 59 and the LED 88 for indicating that the timer reservation mode is set on the operation panel 50a, in addition to the various keys 52-57, the LCD 58 and the LEDs 81-87 which are the same as those in the first embodiment. The key matrix 51 shown in FIG. 4 has a timer reserving key 59 and the display interface 78 is further connected with the LED 88, wherein they are omitted in the drawing.

Similar to the operation of the transmission reserving key 57, when the timer reserving key 59 is depressed, the timer reserving mode is changed to the non-timer reserving mode, or vice versa.

(b) Main controlling part

In the RAM 73 provided within the main controlling part 39 are stored the following parameters, flags and data necessary to execute the system program.

(1) CMP: a controlling mode parameter for indicating one operation mode set among the operation modes of the facsimile apparatus;

(2) TRF: a transmission reservation flag for indicating whether or not the transmission reserving mode is set;

(3) TTF: a timer transmission request flag for indicating whether or not a timer transmission request is generated;

(4) RTF: a retransmission request flag for indicating whether or not a retransmission request is generated;

(5) TIF: a timer reservation flag for showing whether or not the timer reserving mode is set;

(6) OTF: a batch transmission flag for indicating whether or not the operator selects a batch transmission which will be depicted more in detail later, that is, to transmit image data altogether at an already registered time when a facsimile number to be reserved by the timer reservation is the same as a facsimile number of an already reserved party by a transmission reservation;

(7) ISP1: an inner state parameter for controlling the processing order in the document transmitting process to be described later (See FIGS. 19a to 19h);

(8) ISP2: an inner state parameter for controlling the processing order in the transmission reserving process to be described later;

(9) ISP3: an inner state parameter for controlling the processing order in the timer reserving process to be described later (See FIGS. 17a to 17c);

(10) facsimile numbers of a party currently in communication and a party to be communicated next; and

(11) information of the currently set image reading or printing density and image reading fineness.

Figure 12:
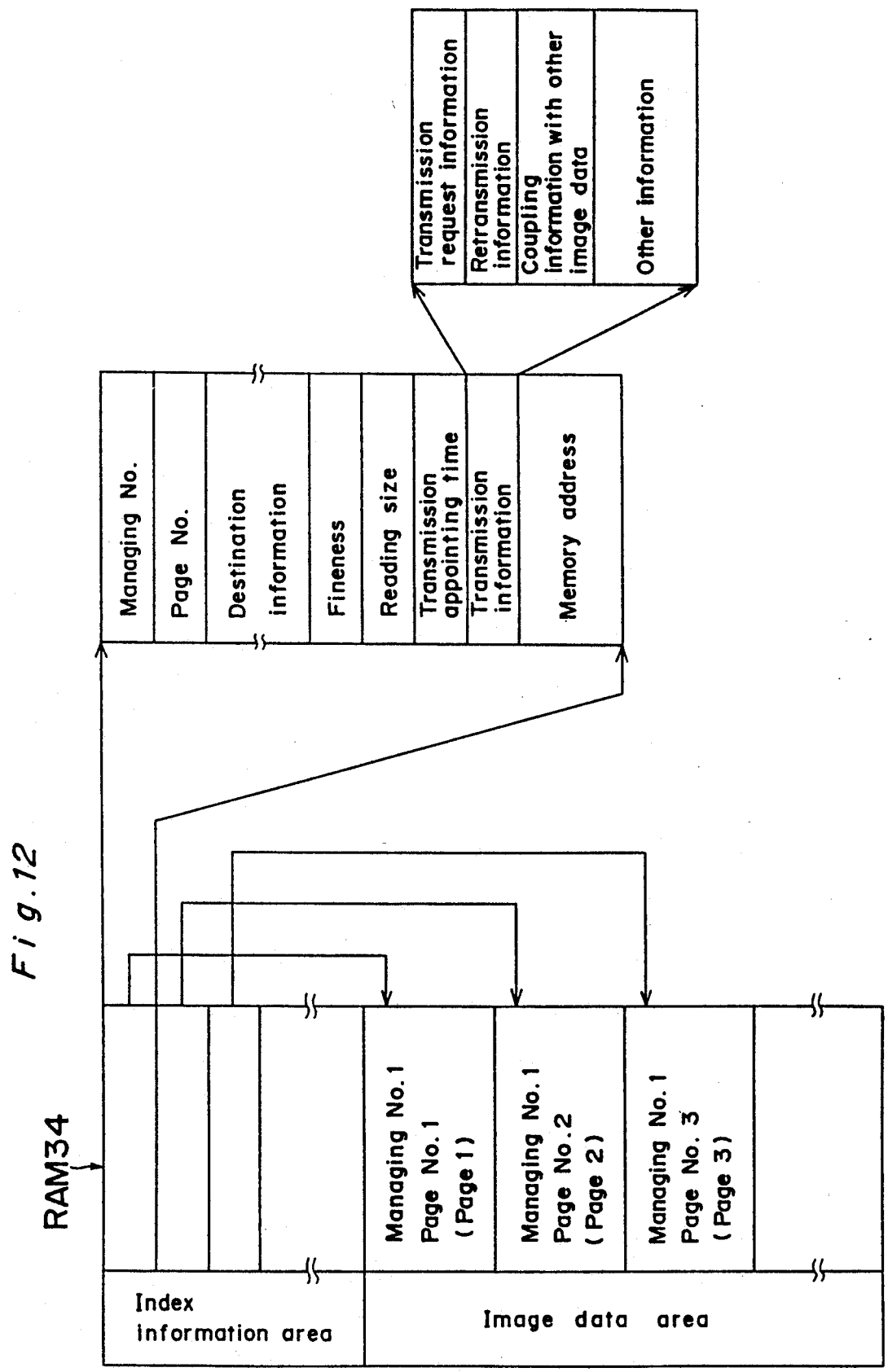
FIG. 12 is a schematic diagram showing a memory map of a RAM 34 of the facsimile apparatus shown in FIG. 11 which is provided for showing a method of managing image data stored therein.

FIG. 12 is a memory map of RAM 34 showing a method of managing image data stored therein.

The memory area of RAM 34 is, as indicated in FIG. 12, divided into an index information area where various kinds of information related to image data is stored, and an image data area where image data for waiting for transmission and image data for waiting for printing after being received are stored. Image data of documents of each group are managed by one group of index information consisting of the following eight items per every page.

(1) Managing number: The managing number is incremented by one when image data are stored in the RAM 34 for every process of an immediate transmission, a transmission reservation, a timer reservation or a reception, which is allotted to a group of image data composed of one or a plurality of pages. Therefore, the operator becomes able to confirm the index information or delete image data stored in the RAM 34 by use of the managing number in a known manner. The managing number is 16 at the maximum in the present embodiment.

(2) Page number: A page number is allotted to every one page of each group of image data to be managed, sequentially from the first page of the image data.

(3) Information of the other party: A facsimile number of the destination receiver party, based on which agreement or disagreement among facsimile numbers of a plurality of parties is detected as will be described later.

(4) Fineness information: Information of the image reading fineness is stored at the time of an immediate transmission, a transmission reservation or a timer reservation. On the other hand, the fineness information of the received image data is stored at the reception time. The fineness information may be sometimes changed based on terminal ability information when the terminal ability information is received from a facsimile apparatus of the other party by a training signal after the line is connected therewith.

(5) Reading size information: At the time of an immediate transmission, a transmission reservation or a timer reservation, information of the reading size when document images are read is stored. Meanwhile, at the reception time, information of the size of the received image data is stored. This reading size information may also be changed based on terminal ability information when the terminal ability information is received from a facsimile apparatus of the other party by a training signal after the line is connected therewith.

(6) Transmission appointing time: A current time is set in the case of an immediate transmission and a transmission reservation, while a transmission appointing time is set by the operator in the case of a timer reservation.

(7) Transmission information: including the following four items.

(7-1) Transmission request information: Information as to whether or not the transmission appointing time, or the time for retransmission has come is stored.

(7-2) Retransmission information: A number of the already-performed retransmissions is stored. If this number agrees with a predetermined maximum value, namely, when the line connection is not achieved even after the predetermined number of trials or dials, "an non-transmission report" or the like is printed out to advice this information to the operator.

(7-3) Coupling information with the other image data: There is stored information as to whether or not image data corresponding to the subject index information is coupled with the other image data, i.e., whether or not image data are to be transmitted altogether in a batch transmission. In the second preferred embodiment, the managing number of each group of image data succeeding the image data corresponding to the subject index information is stored as the "coupling information with the other image data". A plurality of groups of image data managed by a plurality of managing numbers can be handled as one unit of image data at the time of a timer reservation or a retransmission. A plurality of groups of image data can be transmitted successively without disconnecting the line.

(7-4) The other information: including information related to the transmission other than the above information.

(8) Memory address: meaning an address of the RAM 34 at which head data of image data of each page are stored.

Hereinbelow, an example of a process for transmitting first and second image data together in a batch transmission, the latter waiting for retransmission when both the image data are directed to the party of the same facsimile number in the case where the operator wishes to transmit the first image data will be discussed.

(1) In the first place, the operator sets a document to be transmitted on the document tray 22.

(2) Thereafter, a reading fineness and a reading density etc. for the set document are set.

(3) The facsimile number of the receiver party is input using the ten key 54.

Figure 16:
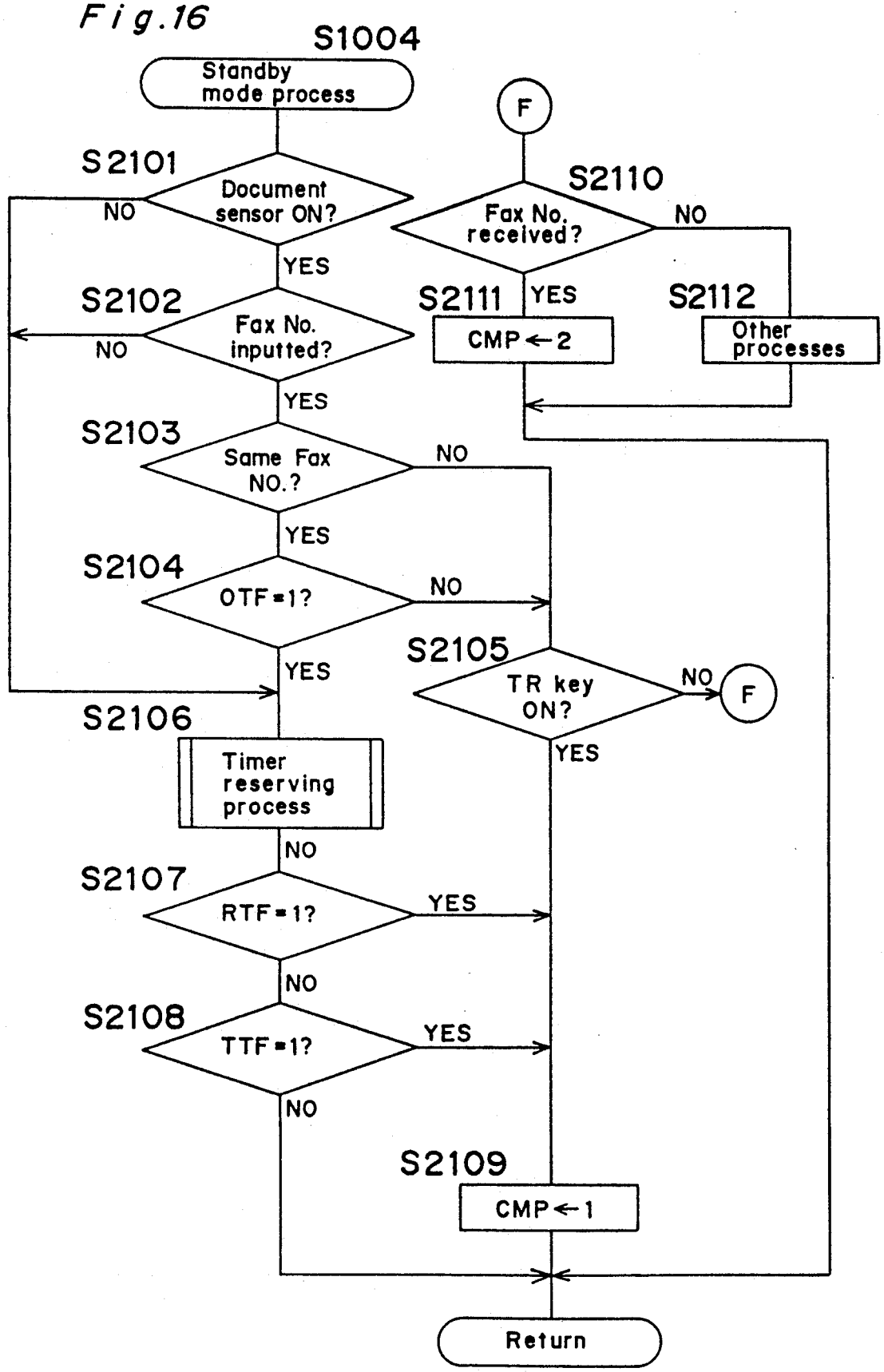
FIG. 16 is a flow chart of a standby mode process of a subroutine shown in FIG. 13.

(4) It is checked whether a facsimile number of the party to which image data already reserved by the timer reservation and stored in the RAM 34 are to be transmitted is the same as a facsimile number input in above step (3) (See step S2103 of the standby mode process shown in FIG. 16).

(5) If the facsimile numbers are not the same in above step (4) (NO in step S2103), first of all, in the document transmitting process in FIG. 19a, index information for images of the document is formed and the images of the document are read, and then, the read image data are compressed and stored in the RAM 34 (See steps S1402 through S1404).

(6) There is performed the line connection process with a facsimile apparatus of the other receiver party (See step S1411 of FIG. 19b), and the first image data are read from the RAM 34 and transmitted through the telephone line 30 to the facsimile apparatus of the receiver party (step S1421 of FIG. 19c).

(7) When the first image data are being transmitted, it is checked whether there is a second image data waiting for re-transmission. If the second image data are present, it is detected whether a facsimile number of the party to which the second image data are to be transmitted is equal to the facsimile number of the party of the first image data (steps S1108 and S1109 of the transmission request checking process shown in FIG. 15b).

(8) If the detection result is YES in both steps S1108 and S1109, the managing number of the first image data currently being transmitted is stored in the "coupling information with the other image data" within the index information related to the second image data (step S1110 of FIG. 15b).

Figure 19D:
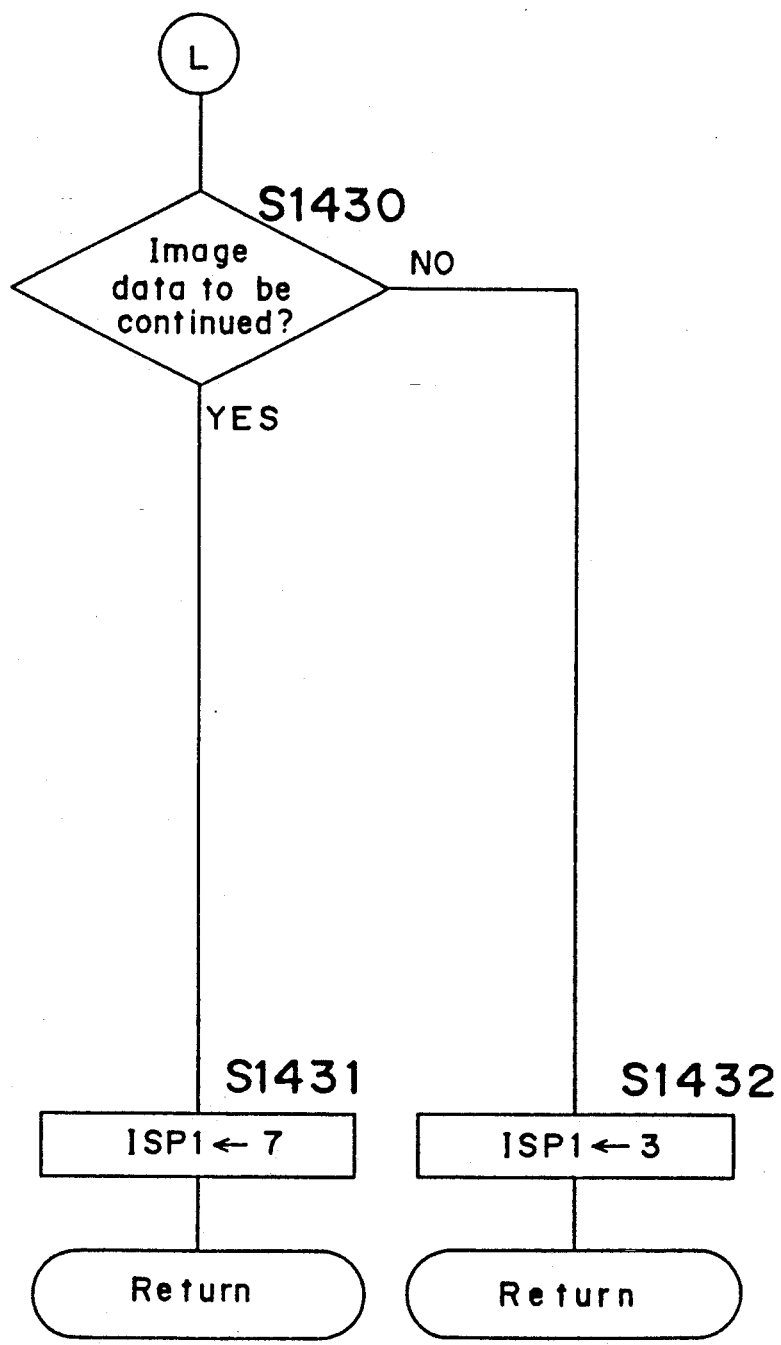

(9) Moreover, after the first image data are completely transmitted, the "coupling information with the other image data" in the index information related to all the image data stored in the RAM 34 is checked, thereby detecting whether or not there is the other image data to be transmitted in succession to the first image data (step S1430 of FIG. 19d).

(10) When the image data to be transmitted (in this case, the above second image data) in succession to the first image data is present, the second image data are kept waiting for transmission (step S1471 of FIG. 19h), and then, the second image data is transmitted in succession to the first image data (step S1421 of FIG. 19c).

Accordingly, since the "coupling information with the other image data" is added to each image data stored in the RAM 34 as described above, a group or a plurality of groups of image data coupled with the image data currently transmitted can be transmitted to the same party sequentially without performing the line disconnection process after completion of a group of image data.

Moreover, in the case of the timer reservation according to the second embodiment, when a facsimile number of the party to which image data to be reserved by the timer reservation (referred to as third image data hereinafter) is to be transmitted agrees with a facsimile number of the party to which image data already stored in RAM 34 (including all the image data to be transmitted by the transmission reservation, the timer reservation, the retransmission and the like, and referred to as fourth image data hereinafter) are transmitted (YES in step S3014 of FIG. 17a), the operator decides whether or not these third and fourth image data should be transmitted together at the already appointed transmitting time of the fourth image data (steps S3021 and S3022 of FIG. 17b). On this occasion, if the batch transmission is selected, images of the fourth image data are read, and the managing number of the third image data is stored in the "coupling information with the other image data" within the index information for the fourth image data. At the same time, the read and converted fourth image data are stored in the RAM 34. Accordingly, the third image data can be transmitted together with the fourth image data at the appointed time.

According to the present embodiment, in the case where the facsimile number of the party of the third image data is coincident with the facsimile number of the party of the fourth image data when the third image data is to be reserved by the timer reservation, whether or not the third and fourth image data should be transmitted together is decided by the operator. However, the present invention is not restricted to such an arrangement as above. The present invention will be effective also when the third image data are transmitted by not only the timer reservation but also the immediate transmission or the transmission reservation.

(c) Processes of facsimile apparatus (c-1) Main routine

Figure 13:
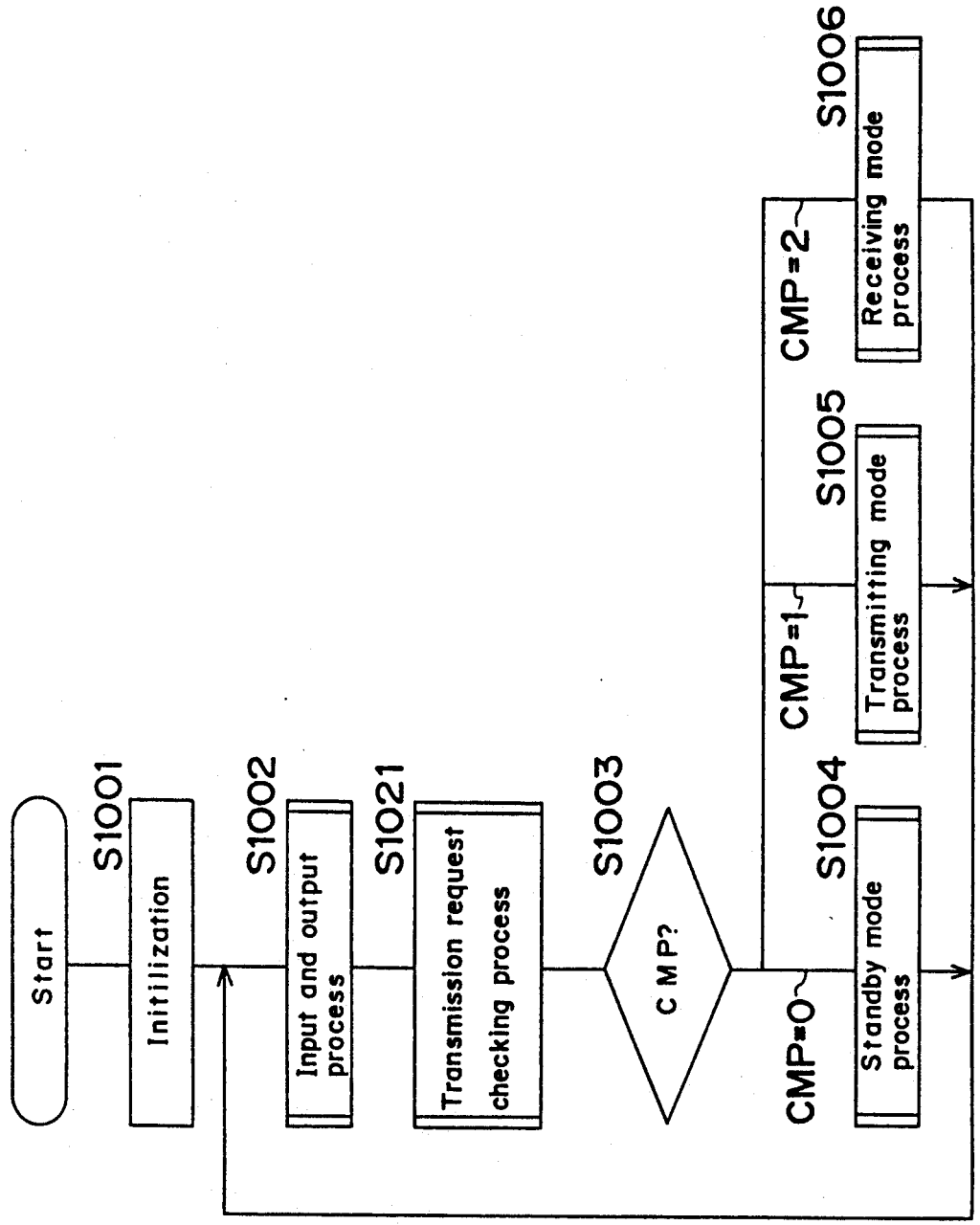
FIG. 13 is a flow chart of a main routine executed by a main controlling part of the facsimile apparatus shown in FIG. 11.

FIG. 13 is a flow chart of a main routine executed by the main controlling part of the facsimile apparatus according to the second preferred embodiment.

Referring to FIG. 13, when the facsimile apparatus is turned ON, a main routine is started. In the first place, initialization is conducted in step S1001, more specifically, the controlling mode parameter CMP, the transmission reservation flag TRF, the timer transmission request flag TTF, the retransmission request flag RTF, the timer reservation flag TIF, the batch transmission flag OTF and the inner state parameters ISP1, ISP2 and ISP3 are set to 0. In the next step S1002, the inputting and outputting process is carried out. In the inputting and outputting process, the transmission reservation flag TRF is set and the LED 87 is turned on or off based on the set value of the flag TRF and the depression of the transmission reservation key 57. Moreover, the timer reservation flag TIF is set and the LED 88 is turned on or off based on the set value of the reservation flag TIF and the depression of the time reservation key 59, and then, a facsimile number of the other party is set.

In step S1021, the transmission request checking process is performed. As will be described later, in step S1021, it is checked whether or not the transmission appointing time of each image data stored in the RAM 34 has come and whether or not image data going to be transmitted should be transmitted in succession to image data waiting for retransmission, etc., and also the timer transmission request flag TTF is set. Thereafter, the controlling mode parameter CMP is checked in step S1003. If the controlling mode parameter CMP is 0, the standby mode process is carried out in step S1004, that is, the transmission conditions are satisfied and the controlling mode parameter CMP is set in accordance with the receipt of the facsimile signals from the other party, and the timer reservation process is performed. Then, the program flow returns to step S1002.

If the controlling mode parameter CMP is 1 in step S1003, the program flow goes to step S1005, where the transmitting mode process is conducted as will be described later. The program flow then returned to step S1002.

Further, if the controlling mode parameter CMP is 2 in step S1003, step S1006 follows step S1003 to carry out the receiving mode process. Then, the program flow goes back to step S1002. In the receiving mode process, there is performed the line connection process with a facsimile apparatus of the other party, a process for receiving a facsimile signal therefrom, a process for converting the facsimile signal into an image signal and a process for printing images of the image signal on a sheet of plain paper, in manners similar to those of the conventional facsimile apparatus. Since the receiving mode process is treated in the same manner as the known process, the detailed description thereof will be abbreviated here.

(c-2) Inputting and outputting process

Figure 14:
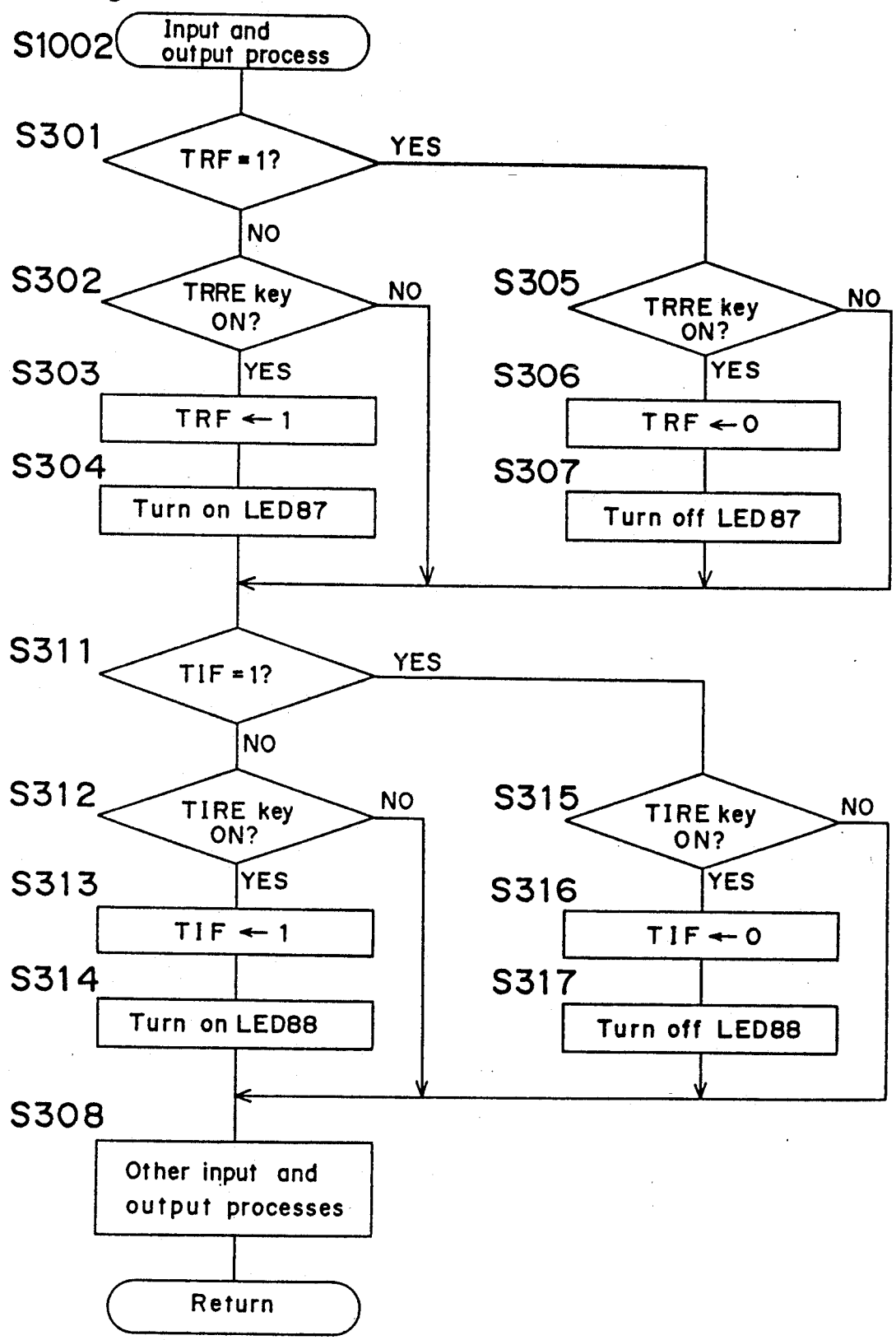
FIG. 14 is a flow chart of an inputting and outputting process of a subroutine shown in FIG. 13.

FIG. 14 is a flow chart of the inputting and outputting process (step S1002) shown in FIG. 13.

In steps S301 through S307 of FIG. 14, based on the set value of the transmission reservation flag TRF and the depression of the transmission reservation key 57, the transmission reservation flag TRF is set and the LED 87 is turned on or off in a manner similar to that of the inputting and outputting process according to the first preferred embodiment shown in FIG. 6.

In the successive step S311, it is detected whether or not the timer reservation flag TIF is 1. It is to be noted here that the timer reservation flag TIF is reset to 1 in the process of the initialization mentioned earlier. When the transmission reservation flag TIF is not 1 (NO in step S311), it is found out in step S312 if the timer reservation key 59 is turned ON. If the timer reserving key 59 is turned ON (YES in step S312), the timer reservation flag TIF is set to 1 in step S313 and the LED 88 of the operating panel 50a is turned ON in step S314, and then, the program flow goes to step S308. If the timer reservation key 59 is not turned ON (NO in step S312), the program flow moves directly to step S308.

On the other hand, when the timer reservation flag TIF is 1 (YES in step S311), the program flow goes to step S315, where it is checked whether or not the timer reservation key 59 is turned ON. With the timer reserving key 59 turned ON (YES in step S315), the timer reservation flag TIF is set to 0 in step S316 and the LED 88 of the operating panel 50a is turned OFF in step S317. The program flow advances to step S308 thereafter. When the timer reservation key 59 is not turned ON in step S315 (NO in step S315), the program flow directly goes to step S308.

In step S308, an input process using the other keys of the operation panel 50a and from sensors and an output process for displaying information on the operating panel 50a are carried out. When a facsimile number of the receiver party is input in step S308 using the ten key 54 of the operating panel 50a, data of the facsimile number is stored in the RAM 73. When the inputting and outputting process is finished in step S308, the flow goes back to the main routine.

(c-3) Transmission demand checking process

Figure 15A:
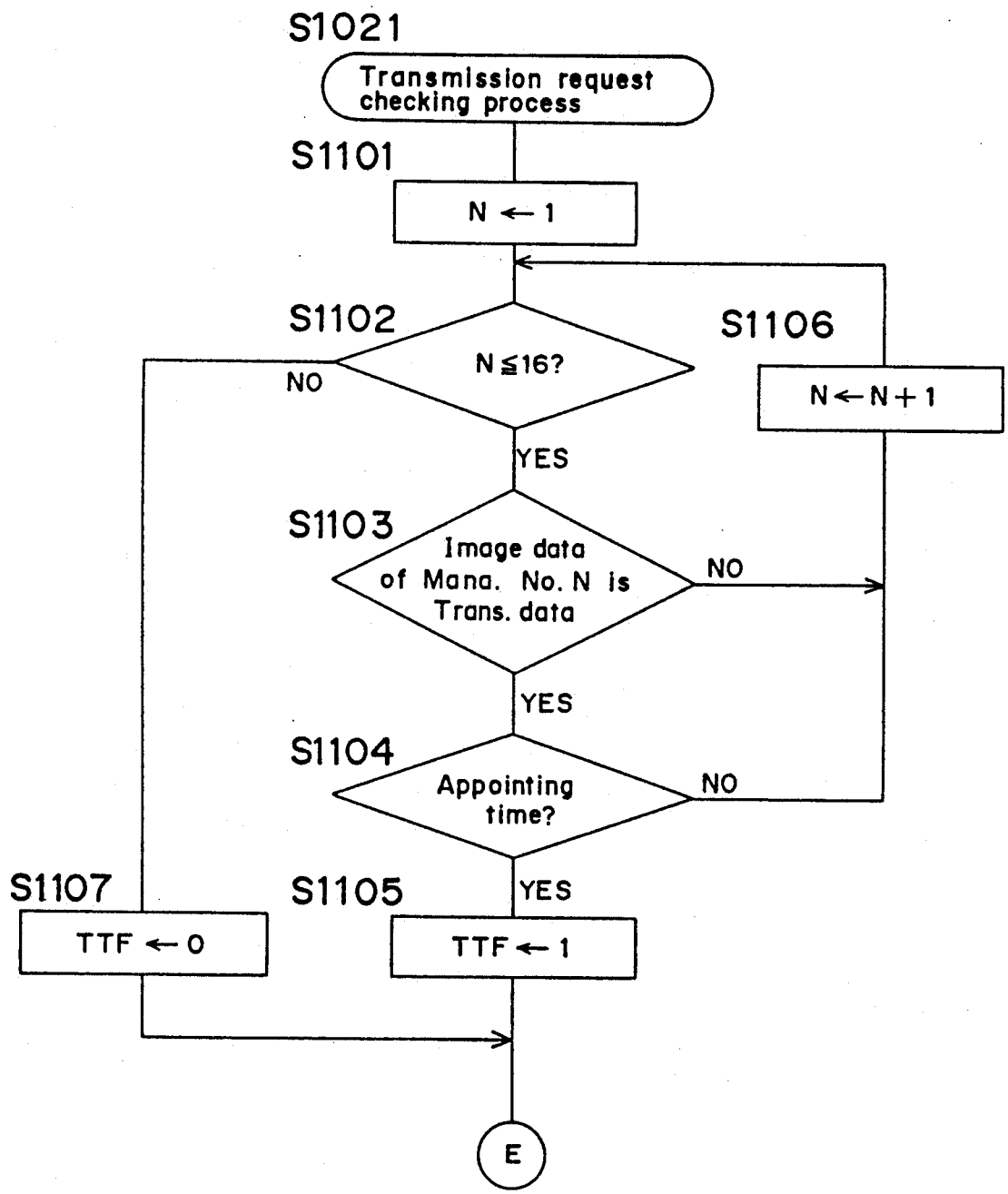

FIGS. 15a and 15b are flow charts of the transmission request checking process (step S1021) shown in FIG. 13.

First of all, as shown in FIG. 15a, the parameter N of the managing number to check the transmission request is initialized to 1 in step S1101. Thereafter, whether the parameter N is not larger than 16 is detected in step S1102. If the parameter N is not larger than 16 (YES in step S1102), it is checked in step S1103 based on the index information of the managing number N whether or not the image data corresponding to the controlling number N is a transmission data. In other words, it is detected whether or not the image data is intended for the immediate transmission, the transmission reservation, the timer reservation or waiting for retransmission. Thereafter, it is detected in step S1104 whether or not it is the time appointed for transmission of the image data, or the transmission appointing time has come. In the case where the image data corresponding to the managing number N are not transmission data but a receiving data (NO in step S1103), or if the transmission appointing time thereof has not come yet (NO in step S1104), 1 is added to the parameter N in step S1106, thereby setting an updated parameter N. Then, the program flow returns to step S1102. In the meantime, when the image data of the managing number N are transmission data (YES in step S1103) and the transmission appointing time thereof has come (YES in step S1104), the timer transmission request flag TTF is set to 1 in step S1105, and then, the program flow is proceeded to step S1108 of FIG. 15b. In contrast, when the parameter N exceeds 16 in step S1102 (NO in step S1102), the timer transmission request flag TTF is reset to 0 in step S1107, and then, the program flow goes to step S1108.

In step S1108 of FIG. 15b, it is detected on the basis of the index information stored in the RAM 34 whether or not the image data are present waiting for retransmission. If there is the image data waiting for retransmission (YES in step S1108), it is detected whether or not a facsimile number of the party to which image data of documents are going to be transmitted is the same as a facsimile number of the party to which the image data waiting for retransmission is transmitted. If both numbers agree with each other (YES in step S1109), the managing number of the image data going to be transmitted is stored in step S1110 in the "coupling information with the other image data" within the index information of the image data waiting for retransmission, and then, the program flow goes to the main routine. Accordingly, these image data can be continuously transmitted together in the document transmitting process to be described later without performing the line disconnection process.

Meanwhile, if there is found no image data waiting for retransmission (NO in step S1108), the retransmission request flag RTF is reset to 0 in step S1113, and then, the program flow returns to the main routine. Moreover, if the facsimile numbers do not agree with each other (NO in step S1109), it is checked in step S1111 whether or not a predetermined time has passed since the previous transmission. If the predetermined time has passed (YES in step S1111), the retransmission request flag RTF is set to 1 in step S1112, and then, the program flow returns to the main routine. On the other hand, if the predetermined time has not passed (NO in step S1111), the retransmission request flag RTF is reset to 0 in step S1113, and then, the program flow goes back to the main routine.

(c-4) Standby mode process

FIG. 16 illustrates a flow chart of the standby mode process (step S1004) shown in FIG. 13.

Referring to FIG. 16, in step 2101, it is checked whether or not the document sensor 21 for detecting whether or not a document is placed on the document tray 22 is turned ON. A facsimile number of the other party is set in step S2102 with use of the ten key 54. Then, it is checked whether or not the data of the set facsimile number are stored in the RAM 73. In this case, if the document sensor 21 is in the OFF state (NO in step S2102) or the facsimile number has not input (NO in step S2102), the program flow goes to step S2106. On the other hand, if the document sensor 21 is in the ON state (YES in step S2102) and the facsimile number has input (YES in step S2102), it is detected in step S2103 whether or not the facsimile number input in step S2102 agrees with a facsimile number of another party already stored in the RAM 34. Then, it is detected in step S2104 whether or not the batch transmission flag OTF is 1.

If the facsimile numbers are the same (YES in step S2103) and the batch transmission flag OTF is 1 (YES in step S2104), the program flow proceeds to step S2106 to execute the timer reserving process which will be discussed in detail later. Thereafter in step S2107, it is checked whether or not the retransmission request flag RTF is 1. Subsequently, whether or not the timer transmission request flag TTF is 1 is checked in step S2108. At this time, if both the retransmission request flag RTF is 0 (NO in step S2107) and the timer transmission request flag TTF is 0 (NO in step S2108), the program flow returns to the main routine. However, if the retransmission request flag RTF is 1 (YES in step S2107) or the timer transmission request flag TTF is 1 (YES in step S2108), the controlling mode parameter CMP is set to 1 in step S2109 so as to carry out the transmitting mode process, and the program flow goes back to the main routine.

In the meantime, if the facsimile numbers are not equal to each other (NO in step S2103) or the batch transmission flag OTF is 0 (NO in step S2104), the program flow goes to step S2105, in which it is detected whether or not the transmission key 52 is depressed. When the transmission key 52 is depressed (YES in step S2105), since the transmission conditions are then satisfied, the controlling mode parameter is set to 1 in step S2109 for executing the transmitting mode process. Thereafter, the program flow returns to the main routine.

When the transmission key 52 is not depressed in step S2105 (NO in step S2105), the program flow goes to step S2110, and then, it is judged whether or not a call tone of a reception request signal is received from the other outgoing party. If the call tone of the reception request signal is received (YES in step S2110), the controlling mode parameter CMP is set to 2 in step S2111, with the program flow returning to the main routine. If the call tone of the reception request signal is not received (NO in step S2110), the other processes are carried out in step S2112, and then, the program flow returns to the main routine.

Figure 17A:
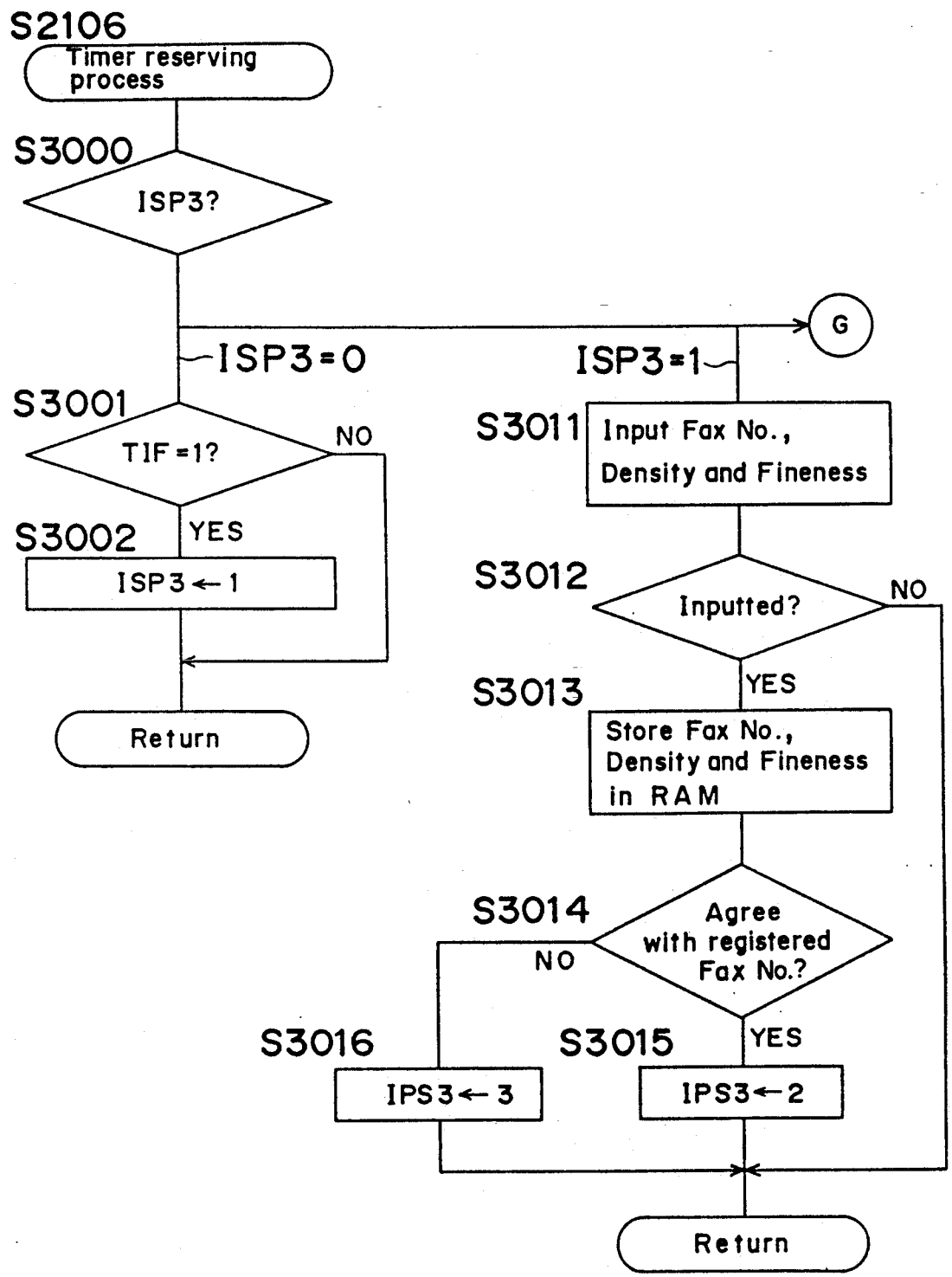
FIGS. 17a to 17c are flow charts of a timer reserving process of a subroutine shown in FIG. 16.
Figure 17B:
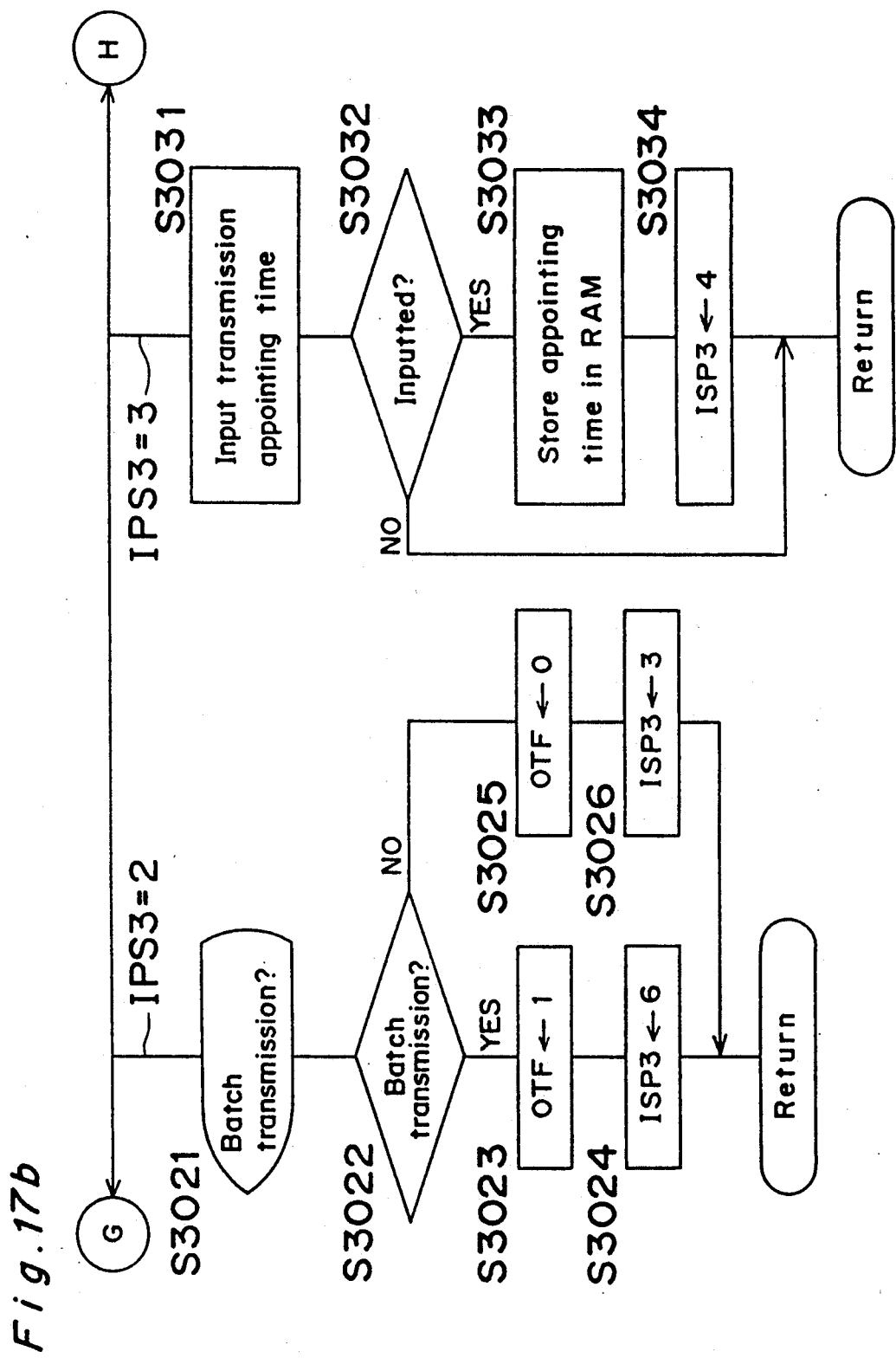
Figure 17C:
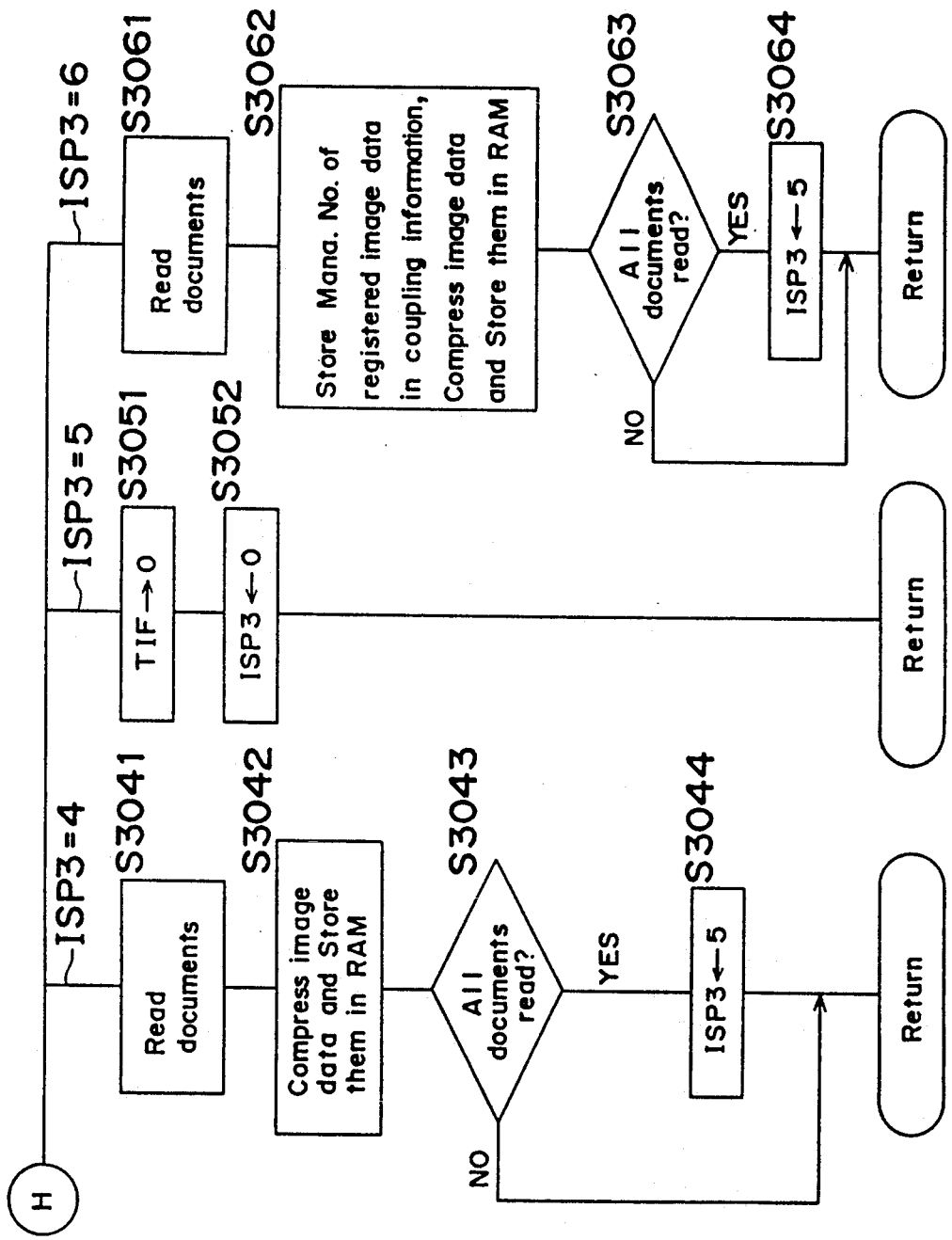

FIGS. 17a to 17c are flow charts of the timer reserving process (step S2106) shown in FIG. 16.

As shown in FIG. 17a, the inner state parameter ISP3 is checked in step S3000. When the inner state parameter ISP3 is 0, 1, 2, 3, 4, 5 and 6, the program flow branches off to step S3001, S3011, S3021, S3031, S3041, S3051 and S3061, respectively.

It is checked in step S3001 whether or not the timer reservation flag TIF is 1. When the timer reservation flag is 1 (YES in step S3001), the inner state parameter ISP3 is updated to 1 in step S3002, and then, the program flow goes to the main routine. If the timer reservation flag TIF is 0 (NO in step S3001), the program flow directly returns to the main routine, skipping step S3002.

After a facsimile number of the party to be transmitted by the timer transmission is input and the image reading density and image reading fineness are set in step S3011, whether or not all the information is completely input is checked in step S3012. If the information is not completely input (NO in step S3012), the program flow goes back to the main routine. On the other hand, if the information is perfectly input (YES in step S3012), the above input information is stored in the RAM 73 in step S3013, and then, it is detected in step S3014 whether or not the facsimile number input in step S3011 agrees with a facsimile number of another party already registered. When the facsimile numbers agree with each other (YES in step S3014), the inner state parameter ISP3 is set to 2 in step S3015, and then, the program flow goes to the main routine. On the other hand, if the facsimile numbers are not coincident with each other (NO in step S3014), the inner state parameter ISP3 is updated to 3 in step S3016. Thereafter, the program flow goes back to the main routine.

In step S3021 of FIG. 17b, the LED 58 displays the following information:

"Is it allowed to transmit the image data presently input for the timer reservation together with the image data already registered at the transmission appointing time xx:xx since the facsimile numbers of the parties of these image data are the same?

If allowed, press the asterisk key "*" in the ten key.

If not, press the sharp key "#" in the ten key."

Subsequently, it is decided in step S3022 whether or not the batch transmission is carried out or not. When the asterisk key "*" is pressed to perform the batch transmission (YES in step S3022), the batch transmission flag OTF is set to 1 in step S3023, with the inner state parameter ISP3 set to 6 in step S3024. Thereafter, the program flow goes to the original routine. When the operator depresses the sharp key "#" so as not to permit the batch transmission (NO in step S3022), the batch transmission flag OTF is reset to 0 in step S3025, and the inner state parameter ISP3 is updated to 3. Thereafter, the program flow goes back to the original routine.

A transmission appointing time for the timer reservation is input in step S3031. Subsequent step S3032 checks whether or not the transmission appointing time is completely input. When the transmission appointing time is finished to be input (YES in step S3032), the input transmission appointing time is stored in the RAM 73 in step S3033, and then, the inner state parameter ISP3 is updated to 4 in step S3034, returning the program flow to the original routine. On the other hand, if the transmission appointing time is not finished to be input in step S3031 (NO in step S3032), the program flow directly goes to the original routine.

In step S3041 of FIG. 17c, the document set on the document tray 22 is fed onto the document glass 2 of the reading part 1, and then, an image of the document is read. After the read image is converted into image data, and the image data are compressed and stored in the RAM 34 in step S3042. It is checked in subsequent step S3043 whether or not images of all the documents on the document tray 22 are completely read and image data thereof are stored in the RAM 34. When reading of the images of all the documents is finished (YES in step S3043), the inner state parameter ISP3 is set and updated to 5 in step S3044, and then, the program flow returns to the original routine. If the images of all the documents is not completely read (NO in step S3043), the program flow goes back to the original routine.

The timer reservation flag TIF is reset to 0 in step S3051, and the inner state parameter ISP3 is reset to 0 in step S3052. Thereafter, the program flow returns to the original routine.

In step S3061 similar to step S3041, a document set on the document tray 22 is sent onto the document glass 2 of the reading part 1, and then, an image of the document is read and converted into image data. When the converted image data are compressed and stored in the RAM 34 in subsequent step S3062, the managing number of the image data transmitted to the same party of the facsimile number already registered is stored in the "coupling information with the other image data" within the index information corresponding to the converted image data. Accordingly, the image data stored in step S3062 is transmitted together in a batch transmission with the image data intended to be transmitted to the already registered party. Thereafter, it is checked in step S3063 whether or not the images of all the documents set on the document tray 22 are read and the image data thereof are stored in the RAM 34. When the images of all the documents are completely read (YES in step S3063), the program flow proceeds to step S3064, wherein the inner state parameter ISP3 is set to 5, with the program flow returned to the original routine. However, if the images of all the documents are not finished to be read (NO in step S3063), the program flow goes back directly to the original routine.

(c-5) Transmitting mode process

Figure 18:
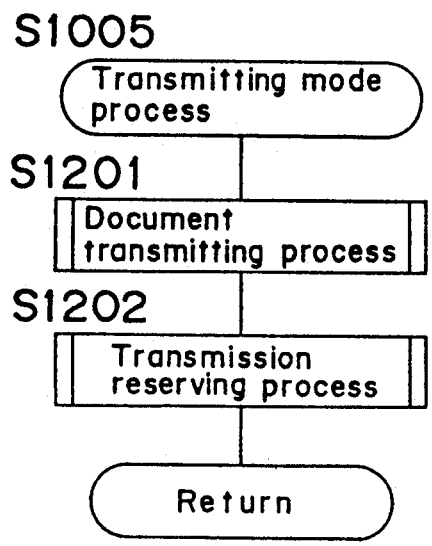
FIG. 18 is a flow chart of a transmitting mode process of a subroutine shown in FIG. 13.

FIG. 18 is a flow chart of the transmitting mode process (step S1005) shown in FIG. 13.

In step S1201 of FIG. 18, there is performed the process for reading an image of a document, the line connection process with the facsimile apparatus of the other party through the telephone line, the process for transmitting image data converted and compressed from the read image, and the line disconnection process etc. In other words, the document transmitting process is conducted in step S1201. Then, in step S1202, a facsimile number of another receiver party to be connected next is input during the communication with the current party, namely, the transmission reserving process is performed. The program flow returns to the main routine.

The transmission reserving process of step S1202 is the same as the transmission reserving process of the first preferred embodiment shown in FIG. 10, the description of which will be omitted.

FIGS. 19a to 19h are flow charts of the document transmitting process (step S1201) shown in FIG. 18.

Referring first to FIG. 19a, when the inner state parameter ISP1 is checked and found 0, 1, 2, 3, 4, 5, 6, 7 and 8 in step S1400, the program flow proceeds to step S1401, S1411, S1421, S1491, S1441, S1451, S1461, S1471 and S1481, respectively.

In step S1401, whether or not a memory transmission for transmitting the image data stored in RAM 34 is requested is detected. When the above memory transmission is requested (YES in step S1401), the inner state parameter ISP1 is updated to 1 in step S1405, returning the program flow to the original routine. On the contrary, if the memory transmission is not requested (NO in step S1401), the program flow goes to step S1402, and then, the document on the document tray 22 is set onto the document glass 2 of the reading part 1. An image of a document is read and converted into image data.

Thereafter, the converted image data are compressed and the compressed image data are stored in the RAM 34 in step S1403. In the following step S1404, whether or not the images of all the documents set on the document tray 22 are perfectly read and image data thereof are stored in RAM 34 is detected. When reading of the images of all the documents is finished (YES in step S1404), the inner state parameter ISP1 is set to 1 in step S1405, with the program flow returned to the original routine. However, if the images of all the documents are not completely read (NO in step S1404), the program flow returns directly to the original routine.

After the line connection process in a predetermined manner is conducted in step S1411 of FIG. 19b, the completion of the line connection process is inspected in step S1412. If the line connection process is completed (YES in step S1412), the program flow returns to the original routine after the inner state parameter ISP1 is updated to 2 in step S1413. If the line connection process is not completed (NO in step S1412), it is found in step S1414 whether or not a predetermined time has passed since the start of the line connection process. When the predetermined time has passed (YES in step S1414), the inner state parameter ISP1 is updated to 8 in step S1415, and then the program flow returns to the original routine. On the other hand, if the predetermined time has not passed in step S1414 (NO in step S1414), the program flow goes to the original routine.

After the image data are read out from the RAM 34 and are transmitted in step S1421 of FIG. 19c, it is checked in step S1422 whether or not the image data is completely transmitted. When the transmission is completed (YES in step S1422), the program flow proceeds to step S1423. On the other hand, when the transmission is not finished (NO in step S1422), the program flow returns to the original routine.

In steps S1423, S1424 and S1425, respectively, it is checked whether or not the transmission reservation flag TRF is 1, whether or not the document sensor 21 of the ADF unit 20 is turned ON, and whether or not the facsimile number of the other party stored in the RAM 73 and currently in communication is equal to the facsimile number reserved by the transmission reservation. When the transmission reservation flag TRF is 1 (YES in step S1423), the document sensor 21 of the ADF unit 20 is turned on (YES in step S1424) and the facsimile numbers are equal to each other (YES in step S1425), the inner state parameter ISP1 is updated to 4 in step S1426. Thereafter, the program flow returns to the original routine.

When the transmission reservation flag TRF is 0 (NO in step S1423) and the document sensor 21 is in the OFF state (NO in step S1424), or the coincidence of the facsimile numbers is not detected (NO in step S1425), it is checked in step S1427 whether or not the timer transmission request flag TTF is 1. When the timer transmission request flag TTF is 1 (YES in step S1427), it is detected in step S1428 whether or not the facsimile number of the party to which the image data have been transmitted in step S1421 agrees with the facsimile number of the party already reserved by the timer transmission. If the facsimile numbers agree with each other (YES in step S1428), the inner state parameter ISP1 is set to 6 in step S1429, with the program flow returning to the original routine. On the other hand, if the timer transmission request flag TTF is 0 (NO in step S1427) or the facsimile numbers do not agree with each other (NO in step S1428), the program flow goes to step S1430 of FIG. 19d, wherein it is detected whether or not there are image data to be transmitted together in succession to the image data transmitted in step S1421 on the basis of the index information stored in the RAM 34. If the image data to be continuously transmitted is present (YES in step S1430), the inner state parameter ISP1 is set to 7 in step S1431, and then, the program flow goes back to the original routine. On the other hand, if the image data to be continuously transmitted is not present (NO in step S1430), the inner state parameter ISP1 is updated to 3 in step S1432. Thereafter, the program flow goes back to the original routine.

Figure 19E:
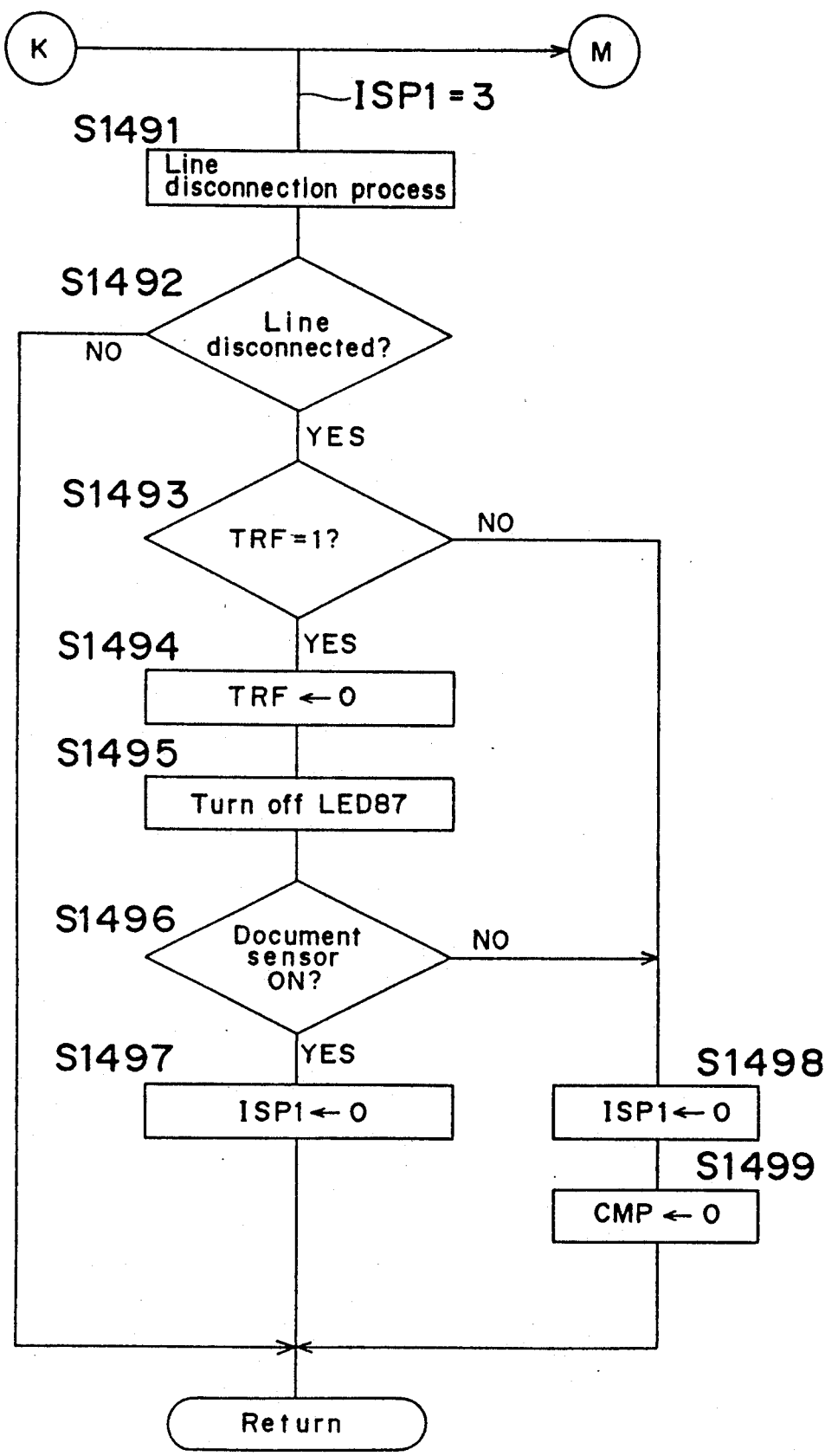

Since the processes from step S1491 to step S1499 shown in FIG. 19e are carried out in manners similar to those from step S431 to step S439 in the first preferred embodiment shown in FIG. 9c, the description thereof will be omitted.

Figure 19F:
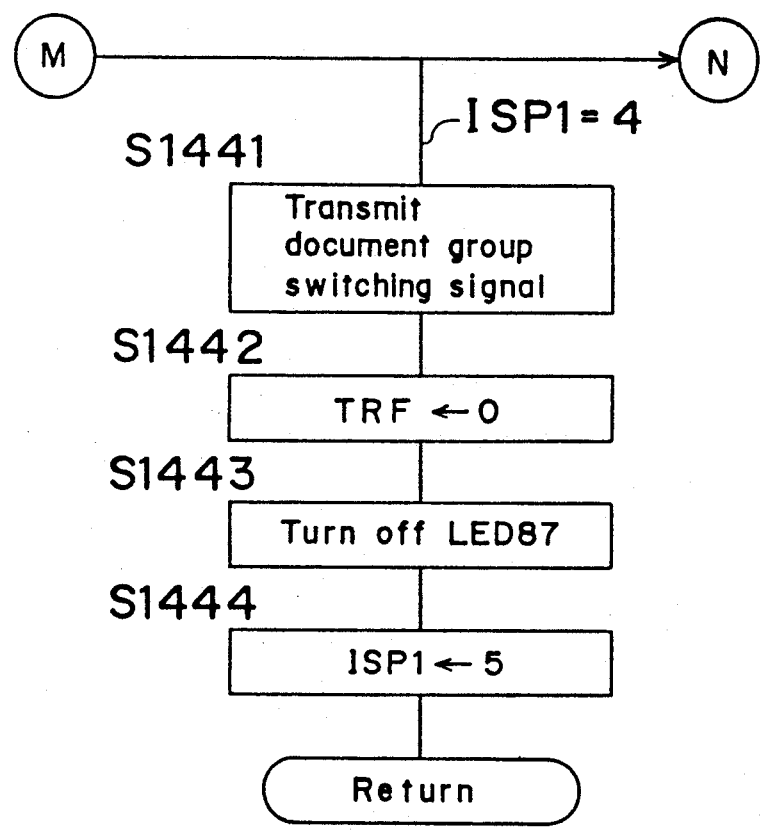

Likewise, since the processes from step S1441 to step S1444 of FIG. 19f is the same as those from step S441 to step S444 in the first preferred embodiment of FIG. 9d, the description will be omitted.

Figure 19G:
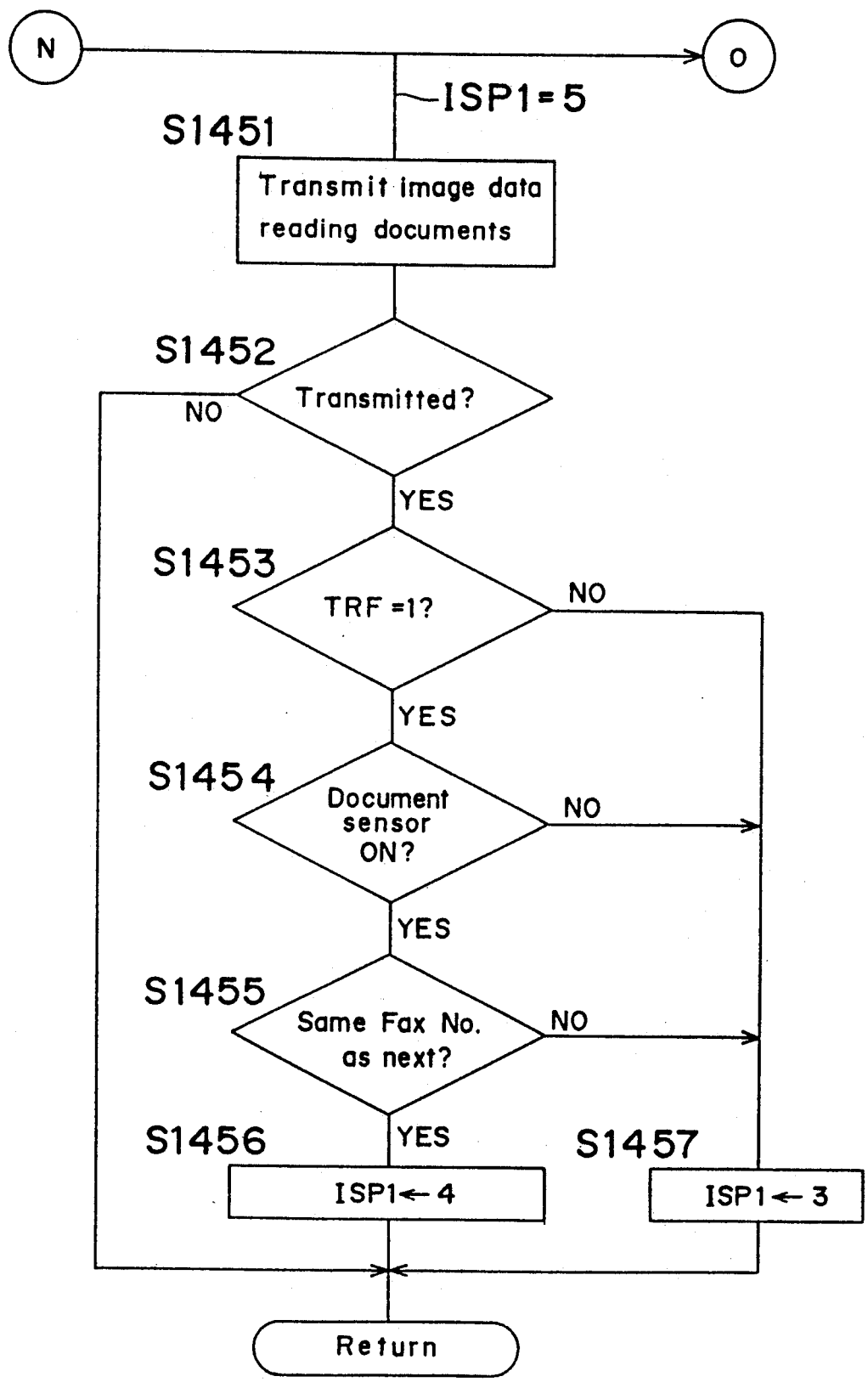

Moreover, the processes from step S1451 to step S1457 of FIG. 19g are executed in manners similar to those from step S451 to step S457 of the first preferred embodiment shown in FIG. 9e, and therefore the description will be omitted.

Figure 19H:
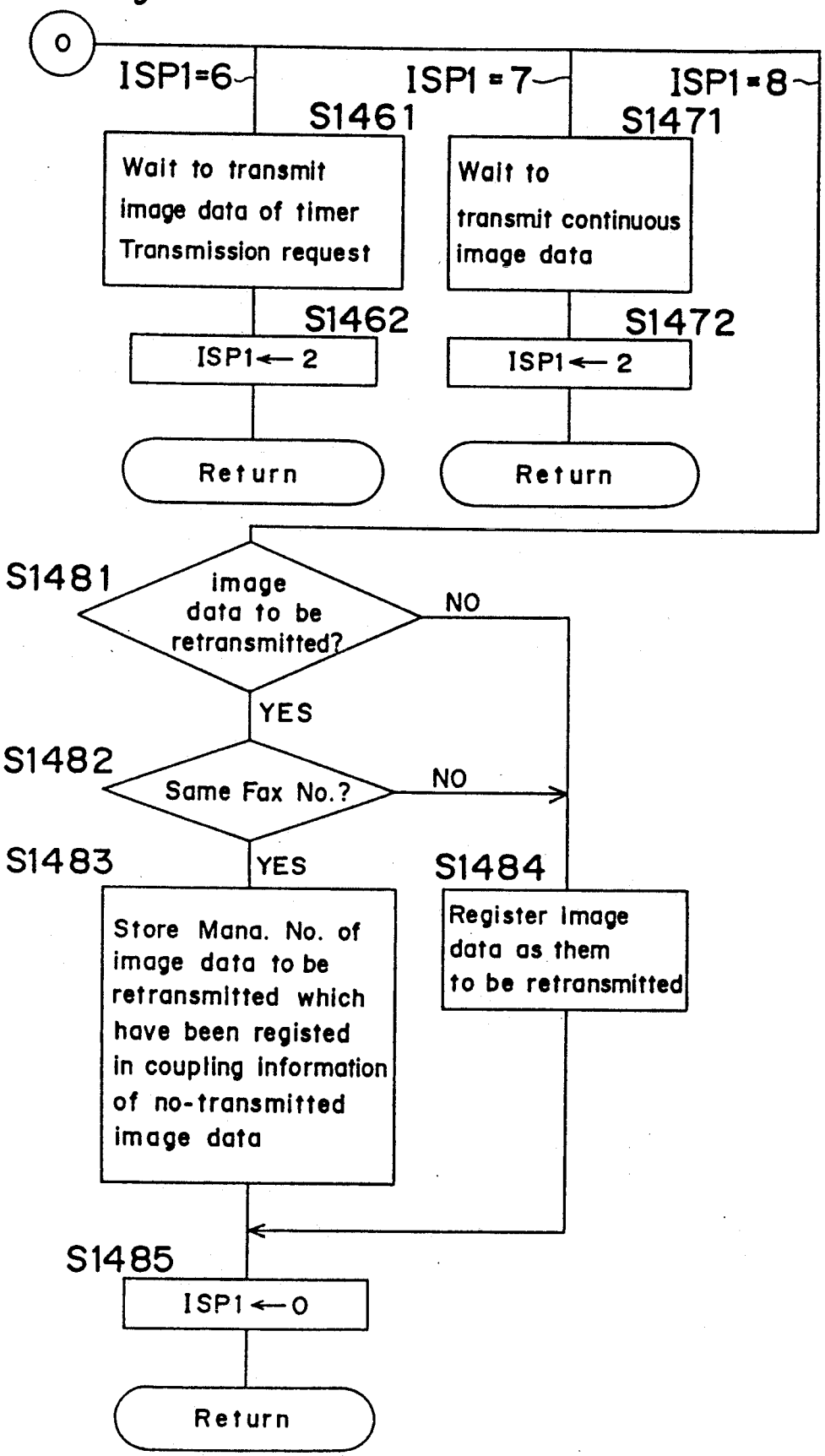

Referring now to FIG. 19h, subsequent to the detection in steps S1427 and S1428 of FIG. 19c that the timer transmission flag TTF is 1 and the facsimile numbers are coincident, the image data to be successively transmitted is kept waiting in step S1461. Thereafter, the inner state parameter ISP1 is set to 2 in step S1462, and then, the program flow then returns to the original routine.

In step S1471, the image data detected in step S1430 to be transmitted in succession to the preceding image data are kept waiting for transmission. After the inner state parameter ISP1 is set to 2 in subsequent step S1472, the program flow returns to the original routine.

It is detected in step S1481 whether or not the image data already registered for retransmission is present. If the image data waiting for retransmission exists (YES in step S1481), it is detected in step S1482 whether or not the facsimile number of the party to which the image data have not been transmitted yet is coincident with the facsimile number of the party to which the image data already registered for retransmission is to be transmitted. If the facsimile numbers are coincident (YES in step S1482), the managing number of the image data waiting for retransmission are stored in the "coupling information with the other image data" within the index information of the image data not transmitted yet in step S1483. Thereafter, the program flow goes to step S1485. Otherwise, if there is no image data to be transmitted by the retransmission (No in step S1481) or the facsimile numbers agree with each other (NO in step S1482), the image data not transmitted yet is registered as image data waiting for retransmission in step S1484, and then, the program flow goes to step S1485. In step S1485, the inner state parameter ISP1 is reset to 1, and then, the program flow goes back to the original routine.

As is fully described hereinabove, according to the present invention, in the case where image signals of the second document which is, for example, reserved by the transmission reservation, reserved by the timer reservation, or reserved as waiting for retransmission are transmitted in succession to the image signals of the first document currently being transmitted, if the facsimile numbers of the both parties to which the both image signals are transmitted are coincident, that is, image signals of the second document are to be transmitted to the same party of the first document, it is avoided that there is performed the line disconnection process with the facsimile apparatus of the party currently in communication with this facsimile apparatus and further performed the line connection process with the same. Therefore, the transmitting efficiency of the image signals is improved as compared with that of the prior art, thereby lowering communication costs.

Other preferred embodiments

In the present preferred embodiments, a facsimile number of a receiver party is input using the ten key 54, and then, data thereof are stored in the RAM 73. However, the present invention is not limited to this. A facsimile number of a receiver party may be previously stored in the RAM 73 with corresponding to or together with an abbreviated code or number corresponding to the facsimile number thereof, and then, the receiver party may be set by inputting the abbreviated code or number using the ten key 54.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A facsimile apparatus comprising:
   reading means for reading images of first and second documents to be transmitted set thereon and converting said read images into first and second image data, respectively;
   party setting means for setting a first receiver party to which said first image data are to be transmitted and a second receiver party to which said second image data are to be transmitted;
   transmitting means for transmitting image data to a facsimile apparatus of a receiver party;
   communication line control means for connecting said transmitting means through a communication line with a facsimile apparatus of a receiver party set by said party setting means before start of transmitting image data by said transmitting means, and disconnecting said connected facsimile apparatus from said transmitting means after completion of transmitting said image data by said transmitting means;
   reservation control means for controlling said transmitting means to start transmitting said second image data at a predetermined timing;
   judgment means for judging whether or not said first receiver party set by said party setting means agrees with said second receiver party set by said party setting means when said first image data are transmitted by said transmitting means after said communication line control means connects said transmitting means through said communication line with a facsimile apparatus of said first receiver party; and
   transmission control means for controlling said transmitting means and said communication line control means to start transmitting said second image data without disconnecting said transmitting means from said facsimile apparatus of said first receiver party after completion of transmitting said first image data, when it is judged by said judgment means that said first receiver party agrees with said second receiver party.

2. The facsimile apparatus as claimed in claim 1, further comprising storage means for temporarily storing image data converted by said reading means.

3. The facsimile apparatus as claimed in claim 2,
wherein said storage means temporarily stores said first image data, and
said judgment means judges whether or not said first receiver party agrees with said second receiver party, when said second receiver party is set by said party setting means after said transmitting means starts transmitting said first image data stored in said storage means reading out said first image data from said storage means.

4. The facsimile apparatus as claimed in claim 3,
wherein said reservation control means controls said transmitting means to start transmitting said second image data at least until said transmitting means is disconnected from said facsimile apparatus of said first receiver party by said communication line control means after completion of transmitting said first image data by said transmitting means, when it is judged by said judgment means that said first receiver party does not agree with said second receiver party.

5. The facsimile apparatus as claimed in claim 3,
wherein said reservation control means comprises time setting means for setting an appointing time when said second image data are to be transmitted by said transmitting means, and
said reservation control means controls said transmitting means to start transmitting said second image data until said appointing time set by said time setting means and controls said transmitting means to start transmitting said second image data at said appointing time set by said time setting means, when it is judged by said judgment means that said first receiver party does not agree with said second receiver party.

6. The facsimile apparatus as claimed in claim 2,
wherein said reservation control means comprises retransmission control means for controlling said transmitting means to restart transmitting image data when a predetermined time has passed since a timing when said transmitting means is not connected with a facsimile apparatus of a receiver party by said communication line control means.

7. The facsimile apparatus as claimed in claim 6, wherein said reservation control means controls said storage means to temporarily store said second image data until a predetermined time has passed since a timing when said transmitting means is not connected with said facsimile apparatus of said first receiver party by said communication line control means and it is judged by said judgment means that said first party does not agree with said second party, thereby enabling to receive image data from a facsimile apparatus of another transmitter party through said communication line.

8. The facsimile apparatus as claimed in claim 3, further comprising number input means for inputting a facsimile number of a receiver party,
wherein said party setting means sets said receiver party in response to said facsimile number inputted by said number input means.

9. The facsimile apparatus as claimed in claim 3, further comprising:
code input means for inputting an abbreviated code for a facsimile number; and
another storage means for storing a facsimile number of a receiver party corresponding to an abbreviated code with corresponding to said abbreviated code,
wherein said party setting means sets said receiver party in response to said abbreviated code inputted by said code input means.

10. A facsimile apparatus comprising: reading means for reading an image of a document to be transmitted set thereon and converting said read image into image data;
party setting means for setting a receiver party to which said image data are to be transmitted;
transmitting means for transmitting image data to a facsimile apparatus of a receiver party;
communication line control means for connecting said transmitting means through a communication line with a facsimile apparatus of a receiver party set by said party setting means before start of transmitting image data by said transmitting means, and disconnecting said connected facsimile apparatus from said transmitting means after completion of transmitting said image data by said transmitting means;
storage means for temporarily storing image data;
reservation control means for controlling said storage means to temporarily store said image data and controlling said transmitting means to start transmitting said image data a predetermined time later from a timing when said transmitting means is not connected through said communication line with said facsimile apparatus of said receiver party set by said party setting means;
judgment means for judging whether or not said receiver party to which said image data stored in said storage means are to be transmitted agrees with the next receiver party next set by said party setting means after next setting an image of a further document corresponding to further image data on said reading means; and
transmission control means for controlling said transmitting means and said communication line control means to continuously transmit said image data temporarily stored in said storage means and said further image data without disconnecting said transmitting means from said facsimile apparatus of said receiver party, when it is judged by said judgment means that said receiver parties agree with each other.

11. A facsimile apparatus comprising: reading means for reading an image of a document set thereon to be transmitted and converting said read image into image data;
party setting means for setting a receiver party to which said image data are to be transmitted;
time setting means for setting an appointing time when said image data converted by said reading means are to be transmitted;
image data storage means for storing said image data converted by said reading means;
transmission data storage means for storing an appointing time set by said time setting means and a receiver party set by said party setting means;
transmitting means for transmitting image data to a facsimile apparatus of a receiver party;

communication line control means for connecting said transmitting means through a communication line with a facsimile apparatus of a receiver party set by said party setting means before start of transmitting image data by said transmitting means, and disconnecting said connected facsimile apparatus from said transmitting means after completion of transmitting said image data by said transmitting means;

judgment means for judging whether or not said receiver party stored in said transmission data storage means agrees with the next receiver party next set by said party setting means after next setting an image of a further document corresponding to further image data on said reading means in the case where said image data to be transmitted are stored in said image data storage means;

selection means for selecting whether or not said image data stored in said image data storage means are to be continuously transmitted together with said further image data corresponding to said further document set on said reading means, when the agreement of said receiver parties is judged by said judgment means; and transmission control means for controlling said transmitting means and said communication line control means to continuously transmit said image data stored in said image data storage means together with said further image data without disconnecting said transmitting means from said facsimile apparatus of said receiver party, when said appointing time set by said time setting means occurs in the case where it is selected by said selection means that said image data stored in said image data storage means are to be continuously transmitted together with said further image data corresponding to said further document next set on said reading means.

12. The facsimile apparatus as claimed in claim 11, wherein said image data storage means stores therein said further image data corresponding to said further document next set on said reading means and converted by said reading means, when it is selected by said selection means that said image data stored in said image data storage means are to be continuously transmitted together with said further image data corresponding to said further document next set on said reading means.

13. The facsimile apparatus as claimed in claim 12, wherein said transmission control means controls said communication line control means to connect said transmission means with a facsimile apparatus of the next receiver party through said communication line, and controls said reading means and said transmission means to transmit said further image data to said facsimile apparatus of the next receiver party reading said image of said further document set on said reading means, when it is not selected by said selection means that said image data stored in said image data storage means are to be continuously transmitted together with said further image data corresponding to said further document next set on said reading means.

* * * * *